US009760509B2

(12) United States Patent
Yu et al.

(10) Patent No.: US 9,760,509 B2
(45) Date of Patent: Sep. 12, 2017

(54) MEMORY STORAGE DEVICE AND CONTROL METHOD THEREOF AND MEMORY CONTROL CIRCUIT UNIT AND MODULE

(71) Applicant: PHISON ELECTRONICS CORP., Miaoli (TW)

(72) Inventors: Hsiang-Hsiung Yu, Hsinchu County (TW); Yuan-Cheng Chang, Miaoli (TW); Wei-Cheng Wu, Miaoli (TW)

(73) Assignee: PHISON ELECTRONICS CORP., Miaoli (TW)

( * ) Notice: Subject to any disclaimer, the term of this patent is extended or adjusted under 35 U.S.C. 154(b) by 200 days.

(21) Appl. No.: 14/480,643

(22) Filed: Sep. 9, 2014

(65) Prior Publication Data
US 2016/0018997 A1  Jan. 21, 2016

(30) Foreign Application Priority Data

Jul. 21, 2014  (TW) .............................. 103124967 A

(51) Int. Cl.
*G06F 3/06* (2006.01)
*G06F 13/16* (2006.01)

(52) U.S. Cl.
CPC .............................. *G06F 13/1673* (2013.01)

(58) Field of Classification Search
CPC ..... G06F 3/0679; G06F 3/0619; G06F 3/0655
USPC ................................................... 711/103, 154
See application file for complete search history.

(56) References Cited

U.S. PATENT DOCUMENTS

| 8,443,167 B1 * | 5/2013 | Fallone | G06F 12/0246 |
| | | | 711/206 |
| 8,694,719 B2 * | 4/2014 | Lassa | G06F 1/206 |
| | | | 711/103 |

* cited by examiner

*Primary Examiner* — Jasmine Song
(74) *Attorney, Agent, or Firm* — Jianq Chyun IP Office

(57) ABSTRACT

A memory storage device including a first and a second connection interface units, a memory control circuit unit and an interfacing circuit is provided. The first connection interface unit and the second connection interface unit are electrically connected to an input/output channel of the memory control circuit unit. The interfacing circuit is disposed between the memory control circuit unit and at least one of the first and the second connection interface units. The interfacing circuit is configured to provide determination information of an electrically connecting configuration between at least one host system and the at least one of the first and the second connection interface units. The memory control circuit unit is configured to provide different operation functions to the at least one host system based on the determination information.

30 Claims, 13 Drawing Sheets

MEMORY STORAGE DEVICE AND CONTROL METHOD THEREOF AND MEMORY CONTROL CIRCUIT UNIT AND MODULE

CROSS-REFERENCE TO RELATED APPLICATION

This application claims the priority benefit of Taiwan application serial no. 103124967, filed on Jul. 21, 2014. The entirety of the above-mentioned patent application is hereby incorporated by reference herein and made a part of this specification.

BACKGROUND

Technical Field

The invention relates to a memory storage device, a memory control circuit unit, a memory control circuit module, and a control method of the memory storage device, and more particularly, relates to a memory storage device with multi-connectors, a memory control circuit unit, a memory control circuit module and a control method of the memory storage device.

Description of Related Art

The growth of digital cameras, mobile phones, and MP3 players has been rapid in recent years. Consequently, the consumers' demand for storage media has increased tremendously. A rewritable non-volatile memory is one of the most adaptable memories for portable electronic products such as laptop computer due to its data non-volatility, low power consumption, small volume, non-mechanical structure and high read/write speed. A flash drive is a portable storage device that adopts a flash memory to serve as storage medium. For these reasons, the flash memory has become an import part of the electronic industries.

Generally, the flash drive includes only one connector to connect to a host system. When the connector is connected to a host system, the host system may access data stored in the flash drive through a connection interface unit of the flash drive. In response to demands for diverse usages, the flash drive is designed to include multi-connectors in order to connect to different host systems. In such design, a memory control circuit unit of the flash drive needs to determine which of at least one connector has been electrically connected to the host system. That is, to determine, by which of the at least one connector is a signal provided by the host system being inputted to the flash drive. In addition, after determining which connector is electrically connected to the host system, the memory control circuit unit of the flash drive also needs to provide different operation functions to the host system, so as to satisfy the demands for diverse usages. Nonetheless, the conventional technology is lack of development for a control method of such memory storage device.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The invention is directed to a memory storage device, a memory control circuit unit, a memory control circuit module and a control method of the memory storage device, and capable of providing different operation functions to a host system connected by connection interface units.

A memory storage device of the invention includes a first connection interface unit, a second connection interface unit, a memory control circuit unit, a rewritable non-volatile memory module and at least one interfacing circuit. The first connection interface unit and the second connection interface unit are configured to be electrically connected to at least one host system. The memory control circuit unit includes an input/output channel. The first connection interface unit and the second connection interface unit are electrically connected to the input/output channel of the memory control circuit unit. The rewritable non-volatile memory module is electrically connected to the memory control circuit unit. The rewritable non-volatile memory module is configured to store data written by the at least one host system. The at least one interfacing circuit is disposed between the memory control circuit unit and at least one of the first and the second connection interface units. The at least one interfacing circuit is configured to provide determination information of an electrically connecting configuration between at least one host system and the at least one of the first connection interface unit and the second connection interface unit. The memory control circuit unit is configured to provide different operation functions to the at least one host system based on the determination information.

In an exemplary embodiment of the invention, the memory control circuit unit is configured to determine whether the at least one host system is electrically connected to the first connection interface unit or the second connection interface unit based on the determination information. The memory control circuit unit declares the memory storage device as different electronic devices to the at least one host system and provides the different operation functions to the at least one host system according to the at least one host system being electrically connected to the first connection interface unit or the second connection interface unit.

In an exemplary embodiment of the invention, the memory control circuit unit is configured to determine the electrically connecting configuration among the at least one host system, the first connection interface unit and the second connection interface unit based on the determination information. The memory control circuit unit declares the memory storage device as different electronic devices to the at least one host system and provides the different operation functions to the at least one host system according to differences in the electrically connecting configuration.

In an exemplary embodiment of the invention, the different operation functions provided by the memory control circuit unit include at least one of a multimedia access function, a data input/output interface function and an information security certification function.

In an exemplary embodiment of the invention, when the at least one host system is electrically connected to the first connection interface unit and the second connection interface unit, the memory control circuit unit is configured to declare the memory storage device as an identical electronic device to the at least one host system and provide the different operation functions to the at least one host system. The different operation functions provided by the memory control circuit unit include different operation authorities for the memory storage device.

In an exemplary embodiment of the invention, each of the first connection interface unit and the second connection interface unit is electrically connected to the input/output channel of the memory control circuit unit through a first type signal transfer path. The at least one interfacing circuit is disposed on at least one of the first type signal transfer paths. The at least one interfacing circuit outputs at least one determination signal to the memory control circuit unit, such that the memory control circuit unit is capable of determining whether the first connection interface unit and the second connection interface unit are electrically connected to the at least one host system accordingly. The al least one determination signal includes the determination information.

In an exemplary embodiment of the invention, the first type signal transfer paths are suitable for transferring at least one of a power signal and a data signal of the first connection interface unit and the second connection interface unit.

In an exemplary embodiment of the invention, the at least one interfacing circuit includes a current limit circuit and a voltage division circuit. The current limit circuit is electrically connected between the memory control circuit unit and the first connection interface unit or the second connection interface unit. The current limit circuit is configured to limit a transfer direction of a signal provided by the electrically connected first connection interface unit or the electrically connected second connection interface unit to be transferred from the first connection interface unit or the second connection interface unit to the memory control circuit unit. The voltage division circuit is electrically connected between the memory control circuit unit and the first connection interface unit or the second connection interface unit. The voltage division circuit is configured to perform a voltage division on the signal provided by the first connection interface unit or the second connection interface unit, so as to output a determination signal including the determination information to the memory control circuit unit.

In an exemplary embodiment of the invention, the memory storage device further includes at least one signal detection unit. The at least one signal detection unit is electrically connected to the at least one of the first connection interface unit and the second connection interface unit and the at least one interfacing circuit. The at least one signal detection unit is configured to detect at least one analog signal provided by the at least one of the first connection interface unit and the second connection interface unit and convert the at least one analog signal into at least one determination signal suitable for the memory control circuit unit. The at least one determination signal includes the determination information.

In an exemplary embodiment of the invention, the at least one signal detection unit includes a potential detection circuit. The potential detection circuit is configured to compare a potential of the at least one analog signal with a potential of a reference voltage and convert the detected at least one analog signal into the at least one determination signal suitable for the memory control circuit unit according to a comparison result thereof.

In an exemplary embodiment of the invention, the memory storage device further includes at least one switch unit. The at least one switch unit is configured to be electrically connected to the first connection interface unit, the second connection interface unit and the memory control circuit unit respectively by using a plurality of second type signal transfer paths. The memory control circuit unit uses at least one control signal to control an on/off state of the at least one switch unit, such that one of the first connection interface unit and the second connection interface unit is capable of transferring signals to the memory control circuit unit by using the second type signal transfer paths.

In an exemplary embodiment of the invention, the second type signal transfer paths are suitable for transferring at least one of a high-speed transfer signal and a data signal of the connection interface units.

A memory control circuit unit of the invention is configured to control a rewritable non-volatile memory module. The memory control circuit unit includes a host interface, a memory interface and a memory management circuit. The host interface includes an input/output channel. A first connection interface unit and a second connection interface unit are electrically connected to the input/output channel of the host interface. The first connection interface unit and the second connection interface unit are configured to be electrically connected to at least one host system. The memory interface is electrically connected to the rewritable non-volatile memory module. The memory management circuit is electrically connected to the host interface and the memory interface. The at least one interfacing circuit is disposed between the memory control circuit unit and at least one of the first connection interface unit and the second connection interface unit. The at least one interfacing circuit is configured to provide determination information of an electrically connecting configuration between at least one host system and the at least one of the first connection interface unit and the second connection interface unit. The memory management circuit is configured to provide different operation functions to the at least one host system.

In an exemplary embodiment of the invention, the memory management circuit is configured to determine whether the at least one host system is electrically connected to the first connection interface unit or the second connection interface unit based on the determination information. The memory management circuit declares the memory storage device to which the memory control circuit unit belongs as different electronic devices to the at least one host system and provides the different operation functions to the at least one host system according to the at least one host system being electrically connected to the first connection interface unit or the second connection interface unit.

In an exemplary embodiment of the invention, the memory management circuit is configured to determine the electrically connecting configuration among the at least one host system, the first connection interface unit and the second connection interface unit based on the determination information. The memory management circuit declares the memory storage device to which the memory control circuit unit belongs as different electronic devices to the at least one host system and provides the different operation functions to the at least one host system according to differences in the electrically connecting configuration.

In an exemplary embodiment of the invention, the different operation functions provided by the memory management circuit include at least one of a multimedia access function, a data input/output interface function and an information security certification function.

In an exemplary embodiment of the invention, when the at least one host system is electrically connected to the first connection interface unit and the second connection interface unit, the memory control circuit unit is configured to declare the memory storage device to which the memory control circuit unit belongs as an identical electronic device to the at least one host system and provide the different operation functions to the at least one host system. The different operation functions provided by the memory control circuit unit include different operation authorities for the memory storage device.

In an exemplary embodiment of the invention, each of the first connection interface unit and the second connection interface unit is electrically connected to the input/output channel of the host interface through a first type signal transfer path. The at least one interfacing circuit is disposed on at least one of the first type signal transfer paths. The at least one interfacing circuit outputs at least one determination signal to the memory management circuit, such that the memory management circuit is capable of determining whether the first connection interface unit and the second connection interface unit are electrically connected to the at least one host system accordingly. The at least one determination signal includes the determination information.

In an exemplary embodiment of the invention, the first type signal transfer paths are suitable for transferring at least one of a power signal and a data signal of the first connection interface unit and the second connection interface unit.

In an exemplary embodiment of the invention, the at least one interfacing circuit includes a current limit circuit and a voltage division circuit. The current limit circuit is electrically connected between the memory control circuit unit and the first connection interface unit or the second connection interface unit. The current limit circuit is configured to limit a transfer direction of a signal provided by the electrically connected first connection interface unit or the electrically connected second connection interface unit to be transferred from the first connection interface unit or the second connection interface unit to the memory control circuit unit. The voltage division circuit is electrically connected between the memory control circuit unit and the first connection interface unit or the second connection interface unit. The voltage division circuit performs a voltage division on the signal provided by the first connection interface unit or the second connection interface unit, so as to output a determination signal including the determination information to the memory management circuit.

In an exemplary embodiment of the invention, the memory control circuit unit further includes at least one signal detection unit. The at least one signal detection unit is electrically connected to the at least one of the first connection interface unit and the second connection interface unit and the at least one interfacing circuit. The at least one signal detection unit is configured to detect at least one analog signal provided by the at least one of the first connection interface unit and the second connection interface unit and convert the at least one analog signal into at least one determination signal suitable for the memory management circuit. The at least one determination signal includes the determination information.

In an exemplary embodiment of the invention, the at least one signal detection unit includes a potential detection circuit. The potential detection circuit is configured to compare a potential of the at least one analog signal with a potential of a reference voltage and convert the detected at least one analog signal into the at least one determination signal suitable for the memory management circuit according to a comparison result thereof.

In an exemplary embodiment of the invention, the memory control circuit unit further includes at least one switch unit. The at least one switch unit is configured to be electrically connected to the first connection interface unit, the second connection interface unit and the memory control circuit unit respectively by using a plurality of second type signal transfer paths. The memory management circuit uses at least one control signal to control an on/off state of the at least one switch unit, such that one of the first connection interface unit and the second connection interface unit is capable of transferring signals to the memory control circuit unit by using the second type signal transfer paths.

In an exemplary embodiment of the invention, the second type signal transfer paths are suitable for transferring at least one of a high-speed transfer signal and a data signal of the first connection interface unit and the second connection interface unit.

A memory control circuit unit of the invention is configured to control a memory storage device. The memory storage device includes a first connection interface unit, a second connection interface unit and a rewritable non-volatile memory module. The first connection interface unit and the second connection interface unit are configured to be electrically connected to at least one host system. A control method of memory storage device includes the following steps. An electrically connecting configuration between the at least one host system and at least one of the first connection interface unit and the second connection interface unit is determined according to at least one determination signal. The memory storage device further includes at least one interfacing circuit. The at least one interfacing circuit is disposed between the memory control circuit unit and at least one of the first connection interface unit and the second connection interface unit. The at least one interfacing circuit is configured to output at least one determination signal. Different operation functions are provided to the at least one host system according to the electrically connecting configuration between the at least one host system and the at least one of the first connection interface unit and the second connection interface unit.

In an exemplary embodiment of the invention, the step of providing different operation functions to the at least one host system includes: declaring the memory storage device as different electronic devices to the at least one host system, and providing the different operation functions to the at least one host system according to the at least one host system being electrically connected to the first connection interface unit or the second connection interface unit.

The step of providing different operation functions to the at least one host system includes: declaring the memory storage device as different electronic devices to the at least one host system, and providing the different operation functions to the at least one host system according to differences in the electrically connecting configuration among the at least one host system, the first connection interface unit and the second connection interface unit.

In an exemplary embodiment of the invention, the different operation functions provided include at least one of a multimedia access function, a data input/output interface function and an information security certification function.

In an exemplary embodiment of the invention, when the at least one host system is electrically connected to the first connection interface unit and the second connection interface unit, the step of providing different operation functions to the at least one host system includes: declaring the memory storage device as an identical electronic device to the at least one host system, and providing the different operation functions to the at least one host system. The different operation functions provided by the memory control circuit unit include different operation authorities for the memory storage device.

In an exemplary embodiment of the invention, the first connection interface unit and the second connection interface unit are configured to output a power signal, a data signal and a high-speed transfer signal. The step of determining the electrically connecting configuration between the at least one host system and the at least one of the first connection interface unit and the second connection interface unit includes: determining whether the connection interface units are electrically connected to the at least one host system according to one of the power signal, the data signal and the high-speed transfer signal.

A memory storage device of the invention includes a first connection interface unit, a second connection interface unit, a memory control circuit module and a rewritable non-volatile memory module. The first connection interface unit and the second connection interface unit are configured to be electrically connected to at least one host system. The memory control circuit module includes a plurality of input/output channels. The first connection interface unit and the second connection interface unit are electrically connected to the different input/output channels of the memory control circuit module. The rewritable non-volatile memory module is electrically connected to the memory control circuit module. The rewritable non-volatile memory module is configured to store data written by the at least one host system. The memory control circuit module declares the memory storage device as different electronic devices to the at least one host system and provides different operation functions to the at least one host system according to an electrically connecting configuration between the at least one host system and at least one of the first connection interface unit and the second connection interface unit.

In an exemplary embodiment of the invention, the memory control circuit module is configured to determine the electrically connecting configuration among the at least one host system, the first connection interface unit and the second connection interface unit. The memory control circuit module declares the memory storage device as different electronic devices to the at least one host system and provides the different operation functions to the at least one host system according to differences in the electrically connecting configuration.

In an exemplary embodiment of the invention, the different operation functions provided by the memory control circuit module include at least one of a multimedia access function, a data input/output interface function and an information security certification function.

In an exemplary embodiment of the invention, the memory control circuit module includes at least one memory control circuit unit. The at least one memory control circuit unit is electrically connected to the first connection interface unit and the second connection interface unit. The at least one memory control circuit unit is configured to determine the electrically connecting configuration between the at least one host system and the at least one of the first connection interface unit and the second connection interface unit by using one of a power signal, a data signal and a high-speed transfer signal transferred by the first connection interface unit and the second connection interface unit.

In an exemplary embodiment of the invention, the memory control circuit module includes a first memory control circuit unit and a second memory control circuit unit. The first memory control circuit unit is electrically connected to the first connection interface unit. The first memory control circuit unit is configured to determine whether the first connection interface unit is electrically connected to the at least one host system by using one of the power signal, the data signal and the high-speed transfer signal transferred by the first connection interface unit. The second memory control circuit unit is electrically connected to the second connection interface unit. The second memory control circuit unit is configured to determine whether the second connection interface unit is electrically connected to the at least one host system by using one of the power signal, the data signal and the high-speed transfer signal transferred by the second connection interface unit.

In an exemplary embodiment of the invention, the first memory control circuit unit and the second memory control circuit unit are communicated through a coordination signal. When one of the first memory control circuit unit and the second memory control circuit unit accesses data stored in the rewritable non-volatile memory module, another one of the first memory control circuit unit and the second memory control circuit unit does not access the data stored in the rewritable non-volatile memory module.

A memory control circuit module of the invention is disposed in a memory storage device. The memory control circuit module includes at least one memory control circuit unit. The at least one memory control circuit unit includes a plurality of input/output channels. The first connection interface unit and the second connection interface unit are electrically connected to different input/output channels of the at least one memory control circuit unit. The at least one memory control circuit unit is configured to determine an electrically connecting configuration between the at least one host system and at least one of the first connection interface unit and the second connection interface unit. The at least one memory control circuit unit declares the memory storage device as different electronic devices to the at least one host system and provides different operation functions to the at least one host system according to the electrically connecting configuration.

In an exemplary embodiment of the invention, the at least one memory control circuit unit is configured to determine the electrically connecting configuration among the at least one host system, the first connection interface unit and the second connection interface unit. The at least one memory control circuit unit declares the memory storage device as different electronic devices to the at least one host system and provides different operation functions to the at least one host system according to differences in the electrically connecting configuration.

In an exemplary embodiment of the invention, the different operation functions provided by the at least one memory control circuit unit include at least one of a multimedia access function, a data input/output interface function and an information security certification function.

In an exemplary embodiment of the invention, the at least one memory control circuit unit is configured to determine the electrically connecting configuration between the at least one host system and the at least one of the first connection interface unit and the second connection interface unit by using one of a power signal, a data signal and a high-speed transfer signal transferred by the first connection interface unit and the second connection interface unit.

In an exemplary embodiment of the invention, the at least one memory control circuit unit includes a first memory control circuit unit and a second memory control circuit unit. The first memory control circuit unit is electrically connected to the first connection interface unit. The first memory control circuit unit is configured to determine whether the first connection interface unit is electrically connected to the at least one host system by using one of the power signal, the data signal and the high-speed transfer signal transferred by the first connection interface unit. The second memory control circuit unit is electrically connected to the second connection interface unit. The second memory control circuit unit is configured to determine whether the second connection interface unit is electrically connected to the at least one host system by using one of the power signal, the data signal and the high-speed transfer signal transferred by the second connection interface unit.

In an exemplary embodiment of the invention, the first memory control circuit unit and the second memory control circuit unit are communicated through a coordination signal. When one of the first memory control circuit unit and the second memory control circuit unit accesses data stored in the rewritable non-volatile memory module, another one of the first memory control circuit unit and the second memory control circuit unit does not access the data stored in the rewritable non-volatile memory module.

A memory control circuit unit of the invention is configured to control a memory storage device. The memory storage device includes a first connection interface unit, a second connection interface unit and a rewritable non-volatile memory module. The first connection interface unit and the second connection interface unit are configured to be electrically connected to at least one host system. A control method of memory storage device includes the following steps. An electrically connecting configuration between the at least one host system and at least one of the first connection interface unit and the second connection interface unit is determined. The memory storage device is declared as different electronic devices to the at least one host system and different operation functions are provided to the at least one host system according to the electrically connecting configuration between the at least one host system and the at least one of the first connection interface unit and the second connection interface unit.

In an exemplary embodiment of the invention, the step of providing different operation functions to the at least one host system includes: The memory storage device is declared as different electronic devices to the at least one host system and different operation functions are provided to the at least one host system according to the electrically connecting configuration among the at least one host system, the first connection interface unit and the second connection interface unit.

In an exemplary embodiment of the invention, the different operation functions provided include at least one of a multimedia access function, a data input/output interface function and an information security certification function.

In an exemplary embodiment of the invention, the first connection interface unit and the second connection interface unit are configured to output a power signal, a data signal and a high-speed transfer signal. The step of determining the electrically connecting configuration between the at least one host system and the at least one of the first connection interface unit and the second connection interface unit includes: determining the electrically connecting configuration among the at least one host system, the first connection interface unit and the second connection interface unit according to one of the power signal, the data signal and the high-speed transfer signal.

Based on above, in the exemplary embodiments of the invention, according to the electrically connecting configuration between the connection interface units and the host system, the memory control circuit unit is capable of providing the different operation functions to the host system connected by the connection interface units in correspondence to the different connection interface units.

To make the above features and advantages of the disclosure more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
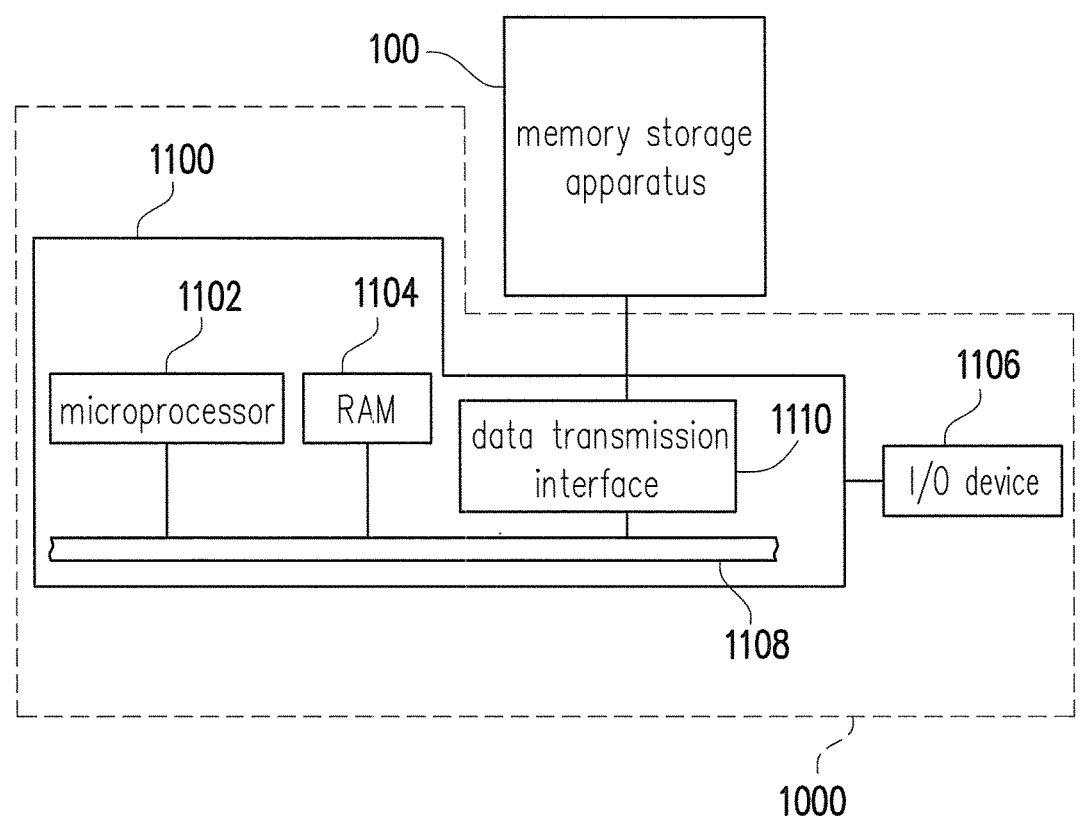
FIG. 1A illustrates a host system and a memory storage device according to an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (a.k.a. a memory storage system) includes a rewritable non-volatile memory module and a controller (a.k.a. a control circuit or a memory control circuit unit). The memory storage device is usually configured together with a host system so that the host system may write data into or read data from the memory storage device.

Figure 1B:
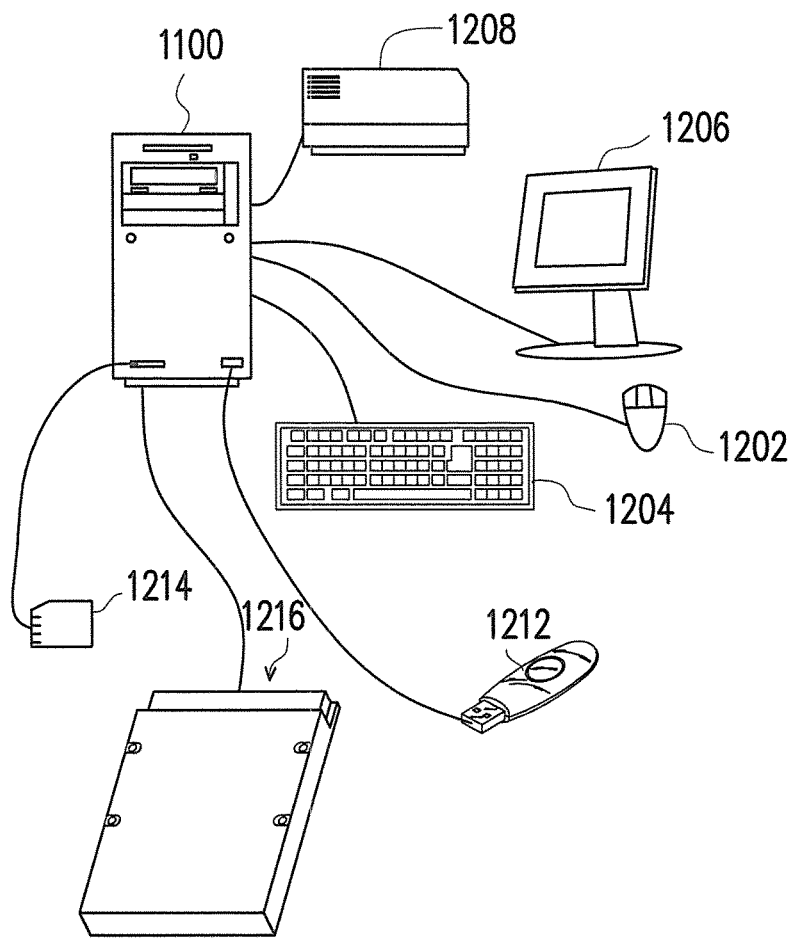
FIG. 1B is a schematic diagram illustrating a computer, an input/output device and a memory storage device according to an exemplary embodiment.
Figure 1C:
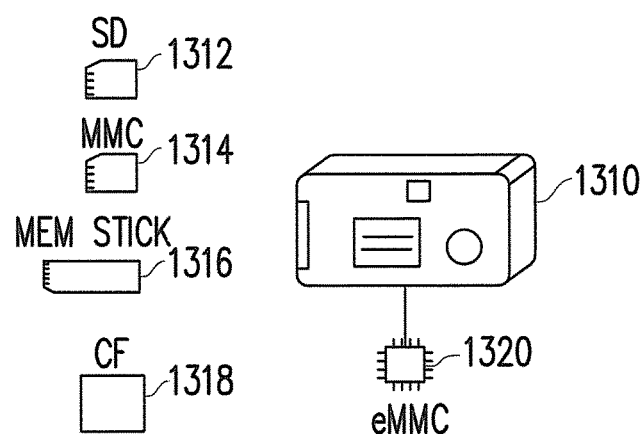
FIG. 1C is a schematic diagram illustrating a host system and a memory storage device according to an exemplary embodiment.

FIG. 1A illustrates a host system and a memory storage device according to an exemplary embodiment. FIG. 1B is a schematic diagram illustrating a computer, an input/output device and a memory storage device according to an exemplary embodiment. FIG. 1C is a schematic diagram illustrating a host system and a memory storage device according to an exemplary embodiment.

Referring to FIG. 1A, a host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206 and a printer 1208 as shown in FIG. 1B. It should be understood that the devices illustrated in FIG. 1B are not intended to limit the I/O device 1106, and the I/O device 1106 may further include other devices.

In the present embodiment of the invention, the memory storage device 100 is coupled to other devices of the host system 1000 through the data transmission interface 1110. By using the microprocessor 1102, the random access memory 1104 and the Input/Output (I/O) device 1106, data may be written into the memory storage device 100 or may be read from the memory storage device 100. For example, the memory storage device 100 may be a rewritable non-volatile memory storage device such as a flash drive 1212, a memory card 1214, or a solid state drive (SSD) 1216 as shown in FIG. 1B. Although the memory storage device 100 (the flash drive 1212 depicted in FIG. 1B) is illustrated to include only one connector to connect to the host system 1000, in other exemplary embodiments of the invention, the memory storage device 100 may also include a plurality of connectors configured to be electrically connected to host systems of the same or different types.

Generally, the host system 1000 may substantially be any system capable of storing data with the memory storage device 100. Although the host system 1000 is described as a computer system in the present exemplary embodiment, in another exemplary embodiment of the invention, the host system 1000 may be a digital camera, a video camera, a telecommunication device, an audio player, or a video player. For example, if the host system is a digital camera (video camera) 1310, the rewritable non-volatile memory storage device may be a SD card 1312, a MMC card 1314, a memory stick 1316, a CF card 1318 or an embedded storage device 1320 (as shown in FIG. 1C). The embedded storage device 1320 includes an embedded MMC (eMMC). It should be mentioned that the eMMC is directly coupled to a substrate of the host system.

Figure 2:
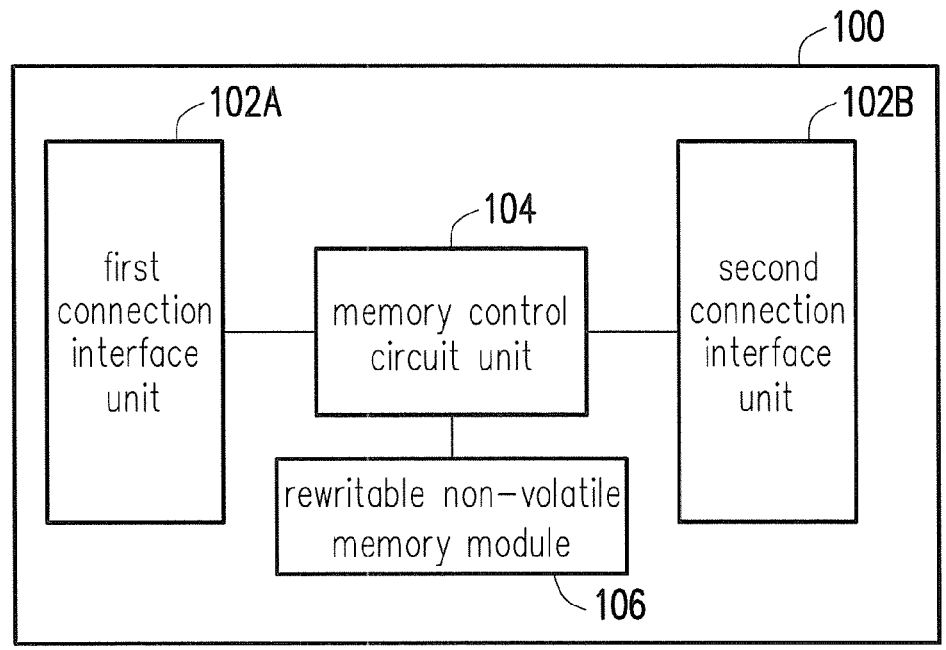
FIG. 2 is a schematic block diagram illustrating the memory storage device depicted in FIG. 1A.

FIG. 2 is a schematic block diagram illustrating the memory storage device depicted in FIG. 1A.

Referring to FIG. 2 which illustrates the memory storage device 100 with two connectors for example, the memory storage device 100 includes a first connection interface unit 102A, a second connection interface unit 102B, a memory control circuit unit 104 and a rewritable non-volatile memory module 106. Each of the first connection interface unit 102A and the second connection interface unit 102B includes a connector. The first connection interface unit 102A and the second connection interface unit 102B are electrically connected to one or more host systems of the same or different types, respectively through the two connectors of the memory storage device 100.

In the present exemplary embodiment, the first connection interface unit 102A and the second connection interface unit 102B are at least compatible with a Universal Serial Bus (USB) standard. Nevertheless, it should be understood that the invention is not limited thereto. The first connection interface unit 102A and the second connection interface unit 102B may also be compatible with a Parallel Advanced Technology Attachment (PATA) standard, an Institute of Electrical and Electronic Engineers (IEEE) 1394 standard, a peripheral component interconnect (PCI) Express interface standard, a Serial Advanced Technology Attachment (SATA) standard, a secure digital (SD) interface standard, a Ultra High Speed-I (UHS-I) interface standard, a Ultra High Speed-II (UHS-II) interface standard, a memory sick (MS) interface standard, a multi media card (MMC) interface standard, an embedded MMC (eMMC) interface standard, a Universal Flash Storage (UFS) interface standard, a compact flash (CF) interface standard, an integrated device electronics (IDE) interface standard or other suitable standards. The first connection interface unit 102A and the second connection interface unit 102B may be packaged into one chip together with the memory control circuit unit 104, or the first connection interface unit 102A and the second connection interface unit 102B are placed outside of a chip containing the memory control circuit unit 104. In an exemplary embodiment where the memory storage device includes multi-connectors, interface standards to which at least one connection interface unit is compatible with may be completely the same, partially the same, or completely different. For example, the interface standards of the first connection interface unit 102A and the second connection interface unit 102B may both be compatible with Second Generation Universal Serial Bus (USB 2.0) standard, or may both be compatible with Third Generation Universal Serial Bus (USB 3.0) standard. Alternatively, one the first and second connection interface units 102A and 102B is compatible with USB 2.0 standard while the other one is compatible with USB 3.0 standard. Alternatively, the interface standards of the first connection interface unit 102A and the second connection interface unit 102B may also be a combination of two among aforementioned interface standards.

The memory control circuit unit 104 is configured to execute a plurality of logic gates or control commands which are implemented in a hardware form or in a firmware form, so as to perform operations of writing, reading or erasing data in the rewritable non-volatile memory storage module 106 according to the commands of the host system 1000.

The rewritable non-volatile memory storage module 106 is coupled to the memory controller 104 and configured to store data written from the host system 1000. The rewritable non-volatile memory module 106 includes a plurality of physical erasing units. For example, the physical erasing units may belong to the same memory die or belong to different memory dies. Each physical erasing unit has a plurality of physical programming units, and the physical programming units of the same physical erasing unit may be written separately and erased simultaneously. For example, each physical erasing unit is composed by 128 physical programming units. Nevertheless, it should be understood that the invention is not limited thereto. Each physical erasing unit is composed by 64 physical programming units, 256 physical programming units or any amount of the physical programming units.

More specifically, the physical erasing unit is the minimum unit for erasing. Namely, each physical erasing unit contains the least number of memory cells to be erased together. The physical programming unit is the minimum unit for programming. That is, the physical programming unit is the minimum unit for writing data. Each physical programming unit usually includes a data bit area and a redundancy bit area. The data bit area having multiple physical access addresses is used to store user data, and the redundant bit area is used to store system data (e.g., control information and error checking and correcting code). In the present exemplary embodiment, each data bit area of the physical programming unit contains 4 physical access addresses, and the size of each physical access address is 512-byte (B). However, in other exemplary embodiments, the data bit area may also include 8, 16, or more or less of the physical address, and amount and sizes of the physical access address are not limited in the invention. For example, the physical erasing unit is a physical block, and the physical programming unit is a physical page or a physical sector.

Figure 3:
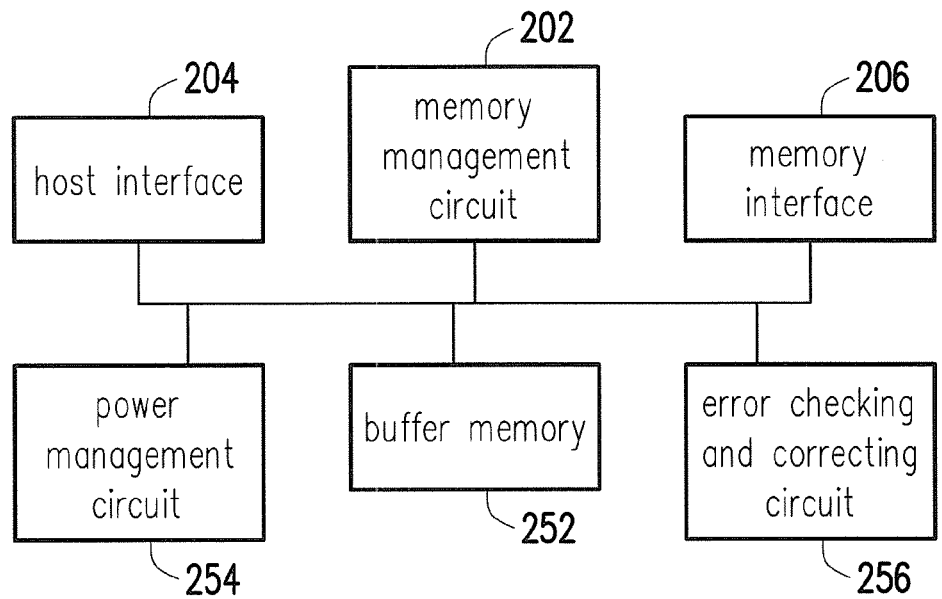
FIG. 3 is a schematic block diagram illustrating a memory control circuit unit according to an exemplary embodiment.

FIG. 3 is a schematic block diagram illustrating a memory control circuit unit according to an exemplary embodiment.

Referring to FIG. 3, the memory control circuit unit 104 includes a memory management circuit 202, a host interface 204 and a memory interface 206.

The memory management circuit 202 is configured to control overall operations of the memory control circuit unit 104. Specifically, the memory management circuit 202 has a plurality of control commands. During operations of the memory storage device 100, the control commands are executed to perform various operations such as writing, reading and erasing data. Operations of the memory management circuit 202 are similar to the operations of the memory control circuit unit 104, thus related description is omitted hereinafter.

In the present exemplary embodiment, the control commands of the memory management circuit 202 are implemented in a form of a firmware. For instance, the memory management circuit 202 has a microprocessor unit (not illustrated) and a ROM (not illustrated), and the control commands are burned into the ROM. When the memory storage device 100 operates, the control commands are executed by the microprocessor to perform operations of writing, reading or erasing data.

In another exemplary embodiment of the invention, the control commands of the memory management circuit 202 may also be stored as program codes in a specific area (for example, the system area in a memory exclusively used for storing system data) of the rewritable non-volatile memory module 106. In addition, the memory management circuit 202 has a microprocessor unit (not illustrated), a ROM (not illustrated) and a RAM (not illustrated). More particularly, the ROM has a boot code, which is executed by the microprocessor unit to load the control commands stored in the rewritable non-volatile memory module 106 to the RAM of the memory management circuit 202 when the memory control circuit unit 104 is enabled. Thereafter, the control commands are executed by the microprocessor unit to perform operations of writing, reading or erasing data.

Further, in another exemplary embodiment of the invention, the control commands of the memory management circuit 202 may also be implemented in a form of hardware. For example, the memory management circuit 202 includes a microcontroller, a memory writing unit, a memory reading unit, a memory erasing unit and a data processing unit. The memory management unit, the memory writing unit, the memory reading unit, the memory erasing unit and the data processing unit are coupled to the microprocessor. The memory management unit is configured to manage the physical erasing units of the rewritable non-volatile memory module 106; the memory writing unit is configured to issue a write command to the rewritable non-volatile memory module 106 in order to write data to the rewritable non-volatile memory module; the memory reading unit is configured to issue a read command to the rewritable non-volatile memory module 106 in order to read data from the rewritable non-volatile memory module 106; the memory erasing unit is configured to issue an erase command to the rewritable non-volatile memory module 106 in order to erase data from the rewritable non-volatile memory module 106; the data processing unit is configured to process both the data to be written to the rewritable non-volatile memory module 106 and the data to be read from the rewritable non-volatile memory module 106.

The host interface 204 is coupled to the memory management circuit 202 and configured to receive and identify commands and data sent from the host system 1000. Namely, the commands and data sent from the host system 1000 are passed to the memory management circuit 202 through the host interface 204. In the present exemplary embodiment, the host interface 204 is compatible with a SATA standard. However, it should be understood that the present invention is not limited thereto, and the host interface 204 may also be compatible with a PATA standard, an IEEE 1394 standard, a PCI Express standard, a USB standard, a SD standard, a UHS-I standard, a UHS-II standard, a MS standard, a MMC standard, a eMMC standard, a UFS standard, a CF standard, an IDE standard, or other suitable standards for data transmission. In the memory storage device 100 including a plurality of connection interface units, an exemplary example of the host interfaces may be one or more host interfaces which are coupled to the memory management circuit 202, and configured to receive and identify commands and data sent from the host system 1000, respectively or commonly. In an exemplary embodiment of the invention, the memory control circuit unit 104 may include one or more input/output channels. In an exemplary embodiment where one single input/output channel is included, the input/output channel may be disposed in the host interface 204. In an exemplary embodiment where multiple input/output channels are included, the input/output channels may all be disposed in the host interface 204, or may be disposed one by one in a plurality of host systems, respectively.

The memory interface 206 is coupled to the memory management circuit 202 and configured to access the rewritable non-volatile memory module 106. That is, data to be written to the rewritable non-volatile memory module 106 is converted to a format acceptable to the rewritable non-volatile memory module 106 through the memory interface 206.

In an exemplary embodiment of the invention, the memory control circuit unit 104 further includes a buffer memory 252, a power management circuit 254 and an error checking and correcting circuit 256.

The buffer memory 252 is coupled to the memory management circuit 202 and configured to temporarily store data and commands from the host system 1000 or data from the rewritable non-volatile memory module 106.

The power management unit 254 is coupled to the memory management circuit 202 and configured to control a power of the memory storage device 100.

The error checking and correcting circuit 256 is coupled to the memory management circuit 202 and configured to perform an error checking and correcting process to ensure the correctness of data. Specifically, when the memory management circuit 202 receives a write command from the host system 1000, the error checking and correcting circuit 256 may generate an error correcting code (ECC code) for data corresponding to the write command, and the memory management circuit 202 writes the data and the ECC code into the rewritable non-volatile memory module 106. Thereafter, when reading the data from the rewritable non-volatile memory module 106, the memory management circuit 202 also reads the corresponding ECC, and the error checking and correcting circuit 256 may execute the error checking and correcting procedure for the read data according to the ECC code.

Figure 4:
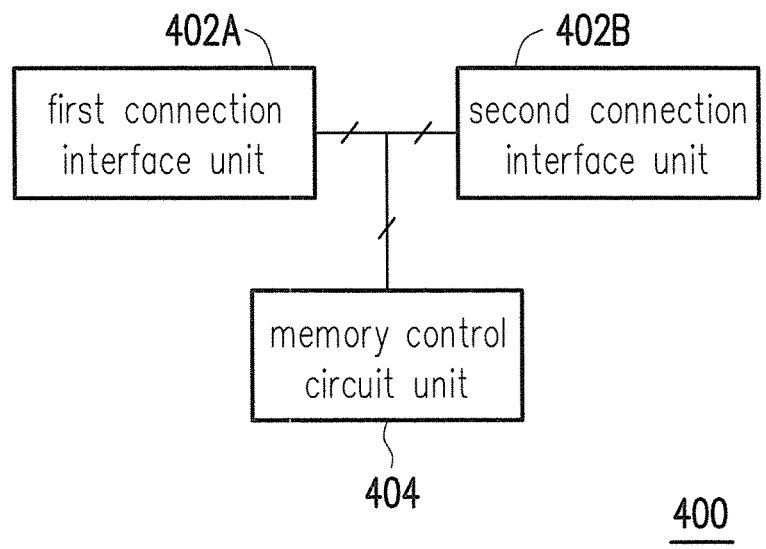
FIG. 4 is a schematic diagram illustrating a memory storage device according to an exemplary embodiment of the invention.

FIG. 4 is a schematic diagram illustrating a memory storage device according to an exemplary embodiment of the invention. Referring to FIG. 4, in order to clearly explain the present exemplary embodiment, FIG. 4 only illustrates a memory control circuit unit 404, a first connection interface unit 402A and a second connection interface unit 402B in a memory storage device 400. It should be noted that, in the hardware architecture of the memory storage device 400, each of the first connection interface unit 402A and the second connection interface unit 402B includes, for example, one connector which is configured to be electrically connected to at least one host system.

In the present exemplary embodiment, the first connection interface unit 402A and the second connection interface unit 402B are configured to be electrically connected to the at least one host system by using the included connectors. Therefore, an electrically connecting configuration between the host system and the first connection interface unit 402A and the second connection interface unit 402B includes (but not limited to) following differences: the first connection interface unit 402A is electrically connected to one host system, and the second connection interface unit 402B is not connected to any host system; the first connection interface unit 402A is not connected to any host system, and the second connection interface unit 402B is electrically connected to one host system; the first connection interface unit 402A is electrically connected to a first host system, and the second connection interface unit 402B is connected to a second host system; and the first connection interface unit 402A and the second connection interface unit 402B are electrically connected to the same host system.

In the present exemplary embodiment, the memory control circuit unit 404 includes an input/output channel, and the first connection interface unit 402A and the second connection interface unit 402B are electrically connected to the input/output channel. Based on determination information of the electrically connecting configuration between the host system and the at least one of the first connection interface unit 402A and the second connection interface unit 402B, the memory control circuit unit 404 provides different operation functions to the connected host system in correspondence to the first connection interface unit 402A and the second connection interface unit 402B which are different. Herein, the host system electrically connected to the at least one of the first connection interface unit 402A and the second connection interface unit 402B may be one or more identical or different host systems. In other words, if the first connection interface unit is electrically connected to the host system, the memory control circuit unit 404 is configured to provide a first operation function to the host system. If the second connection interface unit 402B is electrically connected to the host system, the memory control circuit unit 404 is configured to provide a second operation function to the host system, wherein the first operation function and the second operation function are different. Therefore, the memory control circuit unit 404 is capable of providing the different operation functions to the connected host system according to the electrically connecting configuration between the host system and the at least one of the first connection interface unit 402A and the second connection interface unit 402B.

For instance, according to the host system electrically connected to the first connection interface unit 402A or the second connection interface unit 402B, the memory control circuit unit 404 declares this memory storage device 400 as different electronic devices to the connected host system, and provides the different operation functions to the connected host system. Types of the electronic devices declared by the memory control circuit unit 404 include (but not limited to) a USB disk drive, a USB optical disk drive, a USB keyboard or a USB card reader. Therefore, as in correspondence to the first connection interface unit 402A and the second connection interface unit 402B which are different, the different operation functions provided by the memory control circuit unit 404 include at least one of a multimedia access function, a data input/output interface function and an information security certification function. The information security certification function is, for example, a password authentication function required when the memory storage device 400 is connecting to the corresponding host system. Further, in an embodiment, when the first connection interface unit 402A and the second connection interface unit 402B are electrically connected to the same host system, or electrically connected to different host systems respectively, the memory control circuit unit 404 may also declare the memory storage device 400 as the different electronic devices to the connected host system(s), and provide the different operation functions to the connected host system(s).

In the present exemplary embodiment, the differences in the electrically connecting configuration between the host system and the first connection interface unit 402A and the third connection interface unit 402B may further include the first connection interface unit 402A and the second connection interface unit 402B being connected to the same or different host system(s). In this example, the memory control circuit unit 404 declares the memory storage device 400 as an identical electronic device to the host system(s) (i.e., declared as the memory storage devices 400 to all), and provides the different operation functions to the connected host system(s). The different operation functions provided by the memory control circuit unit 404 includes different operation authorities for the memory storage device 400 (e.g., different accessible memory spaces, or different authorities for read-only, rewritable, and etc.).

In other words, in the present exemplary embodiment, the memory control circuit unit 404 is capable providing different functions in correspondence to the host system(s) electrically connected to the different connection interface units. Herein, the different functions include declaring the memory storage device 400 as the different electronic devices to the host system(s), and declaring the memory storage device 400 as an identical electronic device (i.e., declared as the memory storage device to all, but accessible memory spaces or operational authorities for the host system(s) may be different).

In the present exemplary embodiment, the first connection interface unit 402A and the second connection interface unit 402B may all be compatible with the same transmission interface stand, or include one compatible with a first transmission interface standard while the other one compatible with a second transmission interface standard. For instance, the first connection interface unit 402A and the second connection interface unit 402B are, for example, both compatible with the transmission interface standard of USB 2.0 or both compatible with the transmission interface standard of USB 3.0. Alternatively, the first connection interface unit 402A may be, for example, compatible with the transmission interface standard of USB 1.1, and the second connection interface unit 402B may be, for example, compatible with the transmission interface standard of the SATA standard. Alternatively, the first connection interface unit 402A may be, for example, compatible with the transmission interface standard of USB 3.0, and the second connection interface unit 402B may be, for example, compatible with the transmission interface standard of the eMMC standard. In other words, the transmission interface standards to which the first connection interface unit 402A and the second connection interface unit 402B are compatible with are not particularly limited in the invention.

In the present exemplary embodiment, the memory control circuit unit 404 uses, for example, at least one determination signal to determine whether the first connection interface unit 402A and the second connection interface unit 402B are electrically connected to the at least one host system. In the transmission interface standard of USB 2.0, when the memory storage device 400 is electrically connected to the corresponding host system through the connectors of the first connection interface unit 402A and the second connection interface unit 402B, signals transferred therebetween at least include a power signal VBUS, a data signal D+/D− and a first ground signal GND. Under such standard, the at least one determination signal is, for example, generated according to the power signal VBUS or the data signal D+/D− in USB 2.0. In the transmission interface standard of USB 3.0, when the memory storage device 400 is electrically connected to the corresponding host system through the connectors of the first connection interface unit 402A and the second connection interface unit 402B, signals transferred therebetween at least include a power signal VBUS, a data signal D+/D−, a high-speed transfer signal StdA_SSRX+/StdA_SSRX−, a first ground signal GND and a second ground signal GND_DRAIN. Under such standard, the at least one determination signal is, for example, generated according to the power signal VBUS, the data signal D+/D−, the high-speed transfer signal StdA_SSRX+/StdA_SSRX− in USB 3.0.

In other words, the memory control circuit unit 404 of the present exemplary embodiment is capable of identifying which of the connectors of the first connection interface unit 402A and the second connection interface unit 402B is used for inputting the power signal VBUS or the data signal D+/D− into the memory storage device 400, so as to determine whether the first connection interface unit 402A and the second connection interface unit 402B are electrically connected to the at least one host system, and thereby provide the different operation functions to the host system(s) connected to the first connection interface unit 402A and the second connection interface unit 402B.

Figure 5A:
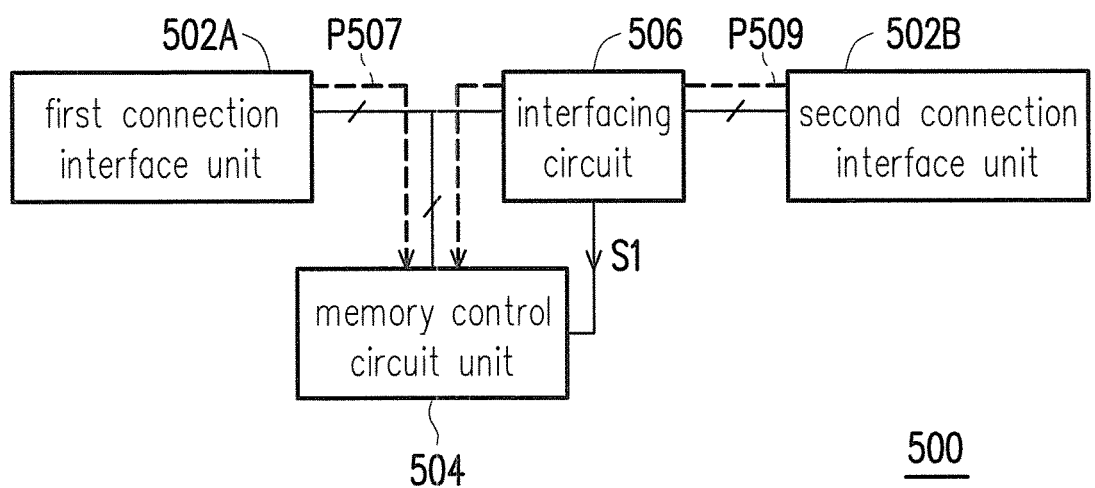
FIG. 5A is a schematic diagram illustrating a memory storage device according to another exemplary embodiment of the invention.

FIG. 5A is a schematic diagram illustrating a memory storage device according to another exemplary embodiment of the invention. Referring to FIG. 5A, a memory storage device 500 of the present exemplary embodiment is similar to the memory storage device 400 of FIG. 4, and a major difference between the two is that the memory storage device 500 further includes an interfacing circuit 506. The interfacing circuit 506 is configured to provide determination information of an electrically connecting configuration between at least one host system and at least one of a first connection interface unit 502A and a second connection interface unit 502B. Accordingly, the memory control circuit unit 504 is configured to provide different operation functions to the connected host system according to the determination information.

In order to clearly explain the present exemplary embodiment, FIG. 5A only illustrates the memory control circuit unit 504, the first connection interface unit 502A, the second connection interface unit 502B and the interfacing circuit 506 in the memory storage device 500. It should be noted that, in the present exemplary embodiment, the memory control circuit unit 504 includes, for example, one input/output channel, and the first connection interface unit 502A and the second connection interface unit 502B are both connected to the same input/output channel of the memory control circuit unit 504. Therefore, the memory storage device 500 further includes the interfacing circuit 506, configured to output a determination signal S1 including the determination information to assist the memory control circuit unit 504 in determining which of the connection interface units is connected to the host system.

In the present exemplary embodiment, the first connection interface unit 502A and the second connection interface unit 502B are electrically connected to the memory control circuit unit 504 respectively through first type signal transfer paths P507 and P509. In the present exemplary embodiment, the interfacing circuit 506 is disposed on the first type signal transfer path P507 between the second connection interface unit 502B and the memory control circuit unit 504. However, the invention is not limited thereto. In other exemplary embodiments, the interfacing circuit 506 may also be disposed on the first type signal transfer path P509 between the first connection interface unit 502A and the memory control circuit unit 504. In the present exemplary embodiment, the first type signal transfer path is, for example, an electrical transfer path suitable for transferring the power signal VBUS in USB 2.0 or USB 3.0. However, the invention is not limited thereto. In other exemplary embodiments, the first type signal transfer path may also be, for example, an electrical transfer path suitable for transferring the data signal D+/D− in USB 2.0 or USB 3.0.

In the present exemplary embodiment, if the second connection interface unit 502B is electrically connected to the corresponding host system, the interfacing circuit 506 generates and outputs the determination signal S1 to the memory control circuit unit 504 according to the power signal VBUS or the data signal D+/D−, such that the memory control circuit unit is capable of determining whether the second connection interface unit 502B is electrically connected to the host system according to the determination signal S1. Accordingly, the memory control circuit unit 504 is capable of providing the different operation functions to the at least one host system according to the determination information of the electrically connecting configuration between the at least one host system and the first connection interface unit 502A and the second connection interface unit 502B.

Figure 5B:
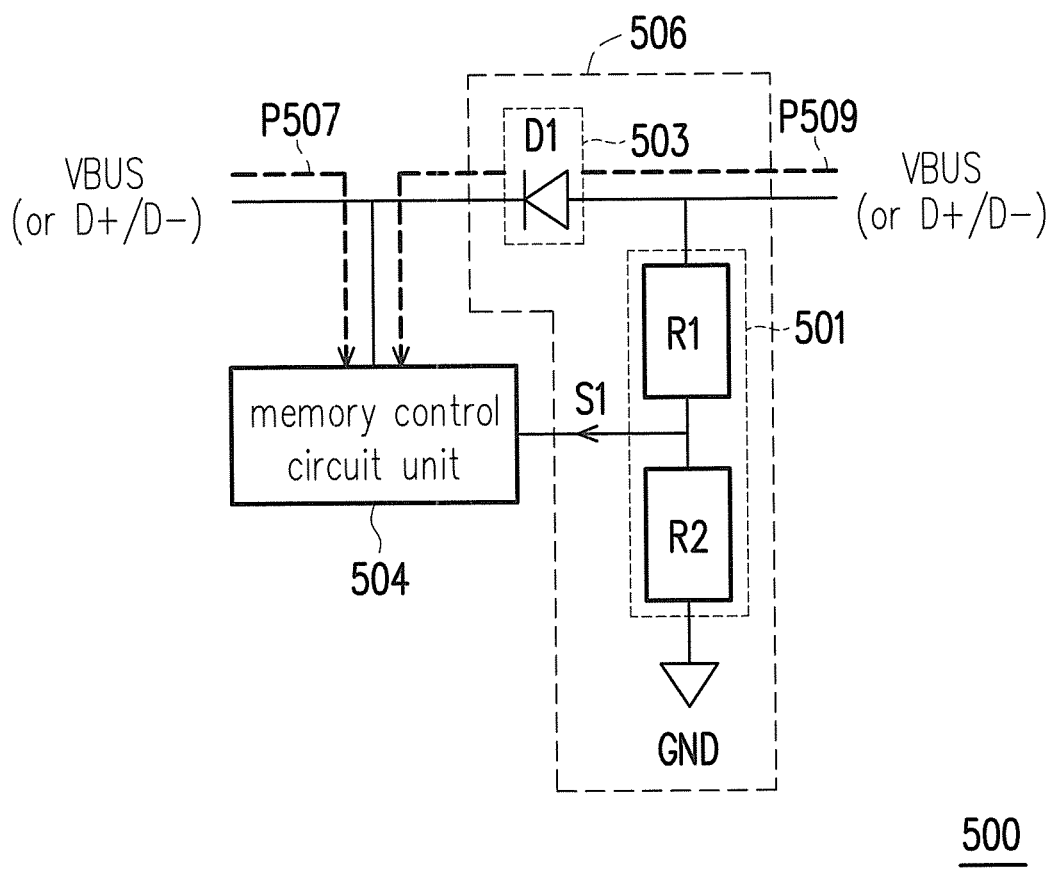
FIG. 5B a schematic diagram illustrating circuitry inside the interfacing circuit of FIG. 5A.

FIG. 5B a schematic diagram illustrating circuitry inside the interfacing circuit of FIG. 5A. Referring to FIG. 5A and FIG. 5B, the interfacing circuit 506 of the present exemplary embodiment includes, for example, a current limit circuit 503 and a voltage division circuit 501.

In the present exemplary embodiment, the current limit circuit 503 includes, for example, a diode D1. The current limit circuit 503 may also be a current limit circuit composed of transistors or other devices. The current limit circuit 503 is configured to be electrically connected between the second connection interface unit 502B and the memory control circuit unit 504, and to limit the power signal VBUS or the data signal D+/D− provided by the second connection interface unit 502B to be transferred from the second connection interface unit 502B to the memory control circuit unit 504. In the present exemplary embodiment, the voltage division circuit 501 includes, for example, two resistors R1 and R2 which are coupled in series. The voltage division circuit 501 is configured to be electrically connected between the second connection interface unit 502B and the memory control circuit unit 504, and perform a voltage division on the power signal VBUS or the data signal D+/D− provided by the second connection interface unit 502B, so as to output the determination signal S1 including the determination information to the memory control circuit unit 504. Take the power signal VBUS provided by the second connection interface unit 502B being 5V for example, the voltage division circuit 501 performs the voltage division on the power signal VBUS to adjust the power signal VBUS into the determination signal S1 being 3.3V which falls within a voltage input range suitable for the memory control circuit unit 504.

In the present exemplary embodiment, the voltage division circuit 501 may also be an external device disposed outside the memory control circuit unit 504, or an internal device built-in the memory control circuit unit 504. In addition, in the exemplary embodiments of FIG. 5A and FIG. 5B, it is illustrated by using one interfacing circuit 506 coupled between the connection interface unit 502B and the memory control circuit unit 504 as an example, but the invention is not limited thereto. In another exemplary embodiment, the memory storage device may also include a plurality of interfacing circuits.

Figure 6A:
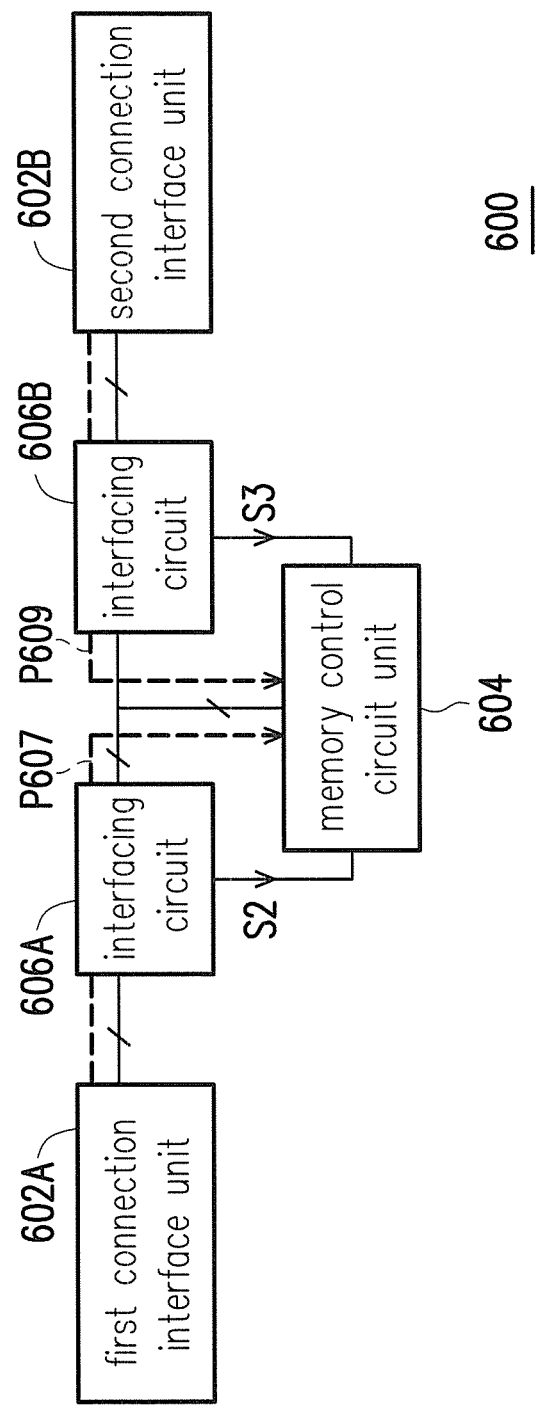
FIG. 6A is a schematic diagram illustrating a memory storage device according to another exemplary embodiment of the invention.
Figure 6B:
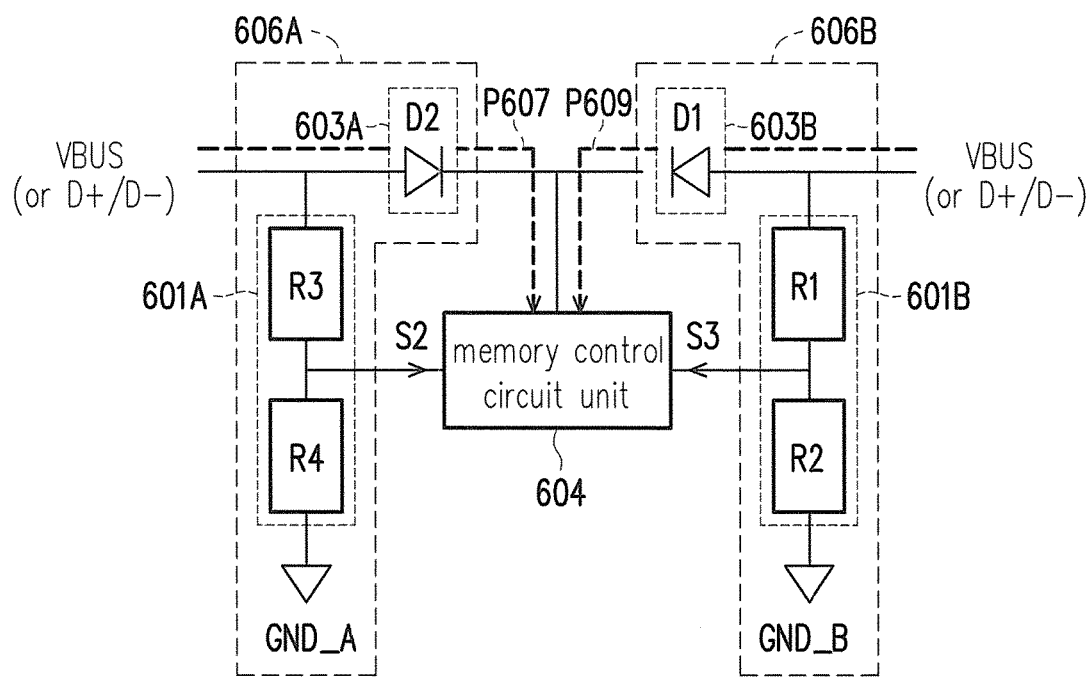
FIG. 6B a schematic diagram illustrating circuitry inside the interfacing circuit of FIG. 6A.

FIG. 6A is a schematic diagram illustrating a memory storage device according to another exemplary embodiment of the invention. FIG. 6B a schematic diagram illustrating circuitry inside the interfacing circuit of FIG. 6A. Referring to FIG. 6A and FIG. 6B, in order to clearly explain the present exemplary embodiment, FIG. 6A only illustrates a memory control circuit unit 604, a first connection interface unit 602A, a second connection interface unit 602B and interfacing circuits 606A and 606B in a memory storage device 600. It should be noted that, in the present exemplary embodiment, the memory storage device 600 includes a plurality of interfacing circuits 606A and 606B.

In the present exemplary embodiment, the interfacing circuits 606A and 606B are disposed on first type signal transfer paths P607 and P609 respectively. The memory control circuit unit 604 uses determination signals S2 and S3 respectively generated by the interfacing circuits 606A and 606B to determine whether the first connection interface unit 602A and the second connection interface unit 602B are electrically connected to the corresponding host system, and a principle of such determination is similar to that in the exemplary embodiments of FIG. 5A and FIG. 5B. Herein, the determination signals S2 and S3 include determination information of an electrically connecting configuration between at least one host system and at least one of the first connection interface unit 602A and the second connection interface unit 602B. That is, the memory control circuit unit 604 uses the interfacing circuits 606A and 606B to adjust the received power signal VBUS or the data signal D+/D− into the determination signals S2 and S3 respectively, which fall within a voltage input range suitable for the memory control circuit unit 604. Subsequently, if the first connection interface unit 602A and the second connection interface unit 602B are electrically connected to the corresponding host system, according to differences between the first connection interface unit 602A and the second connection interface unit 602B, the memory control circuit unit 604 provides different operation functions to the host system(s) connected by the first connection interface unit 602A and the second connection interface unit 602B.

In addition, enough teaching, suggestion, and implementation illustration for disposing configurations, operation methods and effects of other circuitry blocks and elements for the memory storage device 600 in the embodiments of FIG. 6A and FIG. 6B can be obtained from the above embodiments in FIG. 5A and FIG. 5B, thus related descriptions thereof are not repeated hereinafter. It should be noted that, in the present exemplary embodiment, the memory storage device 600 includes two of the interfacing circuits 606A and 606B, but a number of the interfacing circuits is not particularly limited in the invention. Designers may dispose one or more interfacing circuits in the memory storage device based on actual design requirements. Furthermore, inner structures of the interfacing circuits 606A and 606B are not intended to limit the invention. In an exemplary embodiment wherein one or more interfacing circuits are disposed, the inner structures of the one or more interfacing circuits may be completely the same, partially the same, or completely different.

Figure 7:
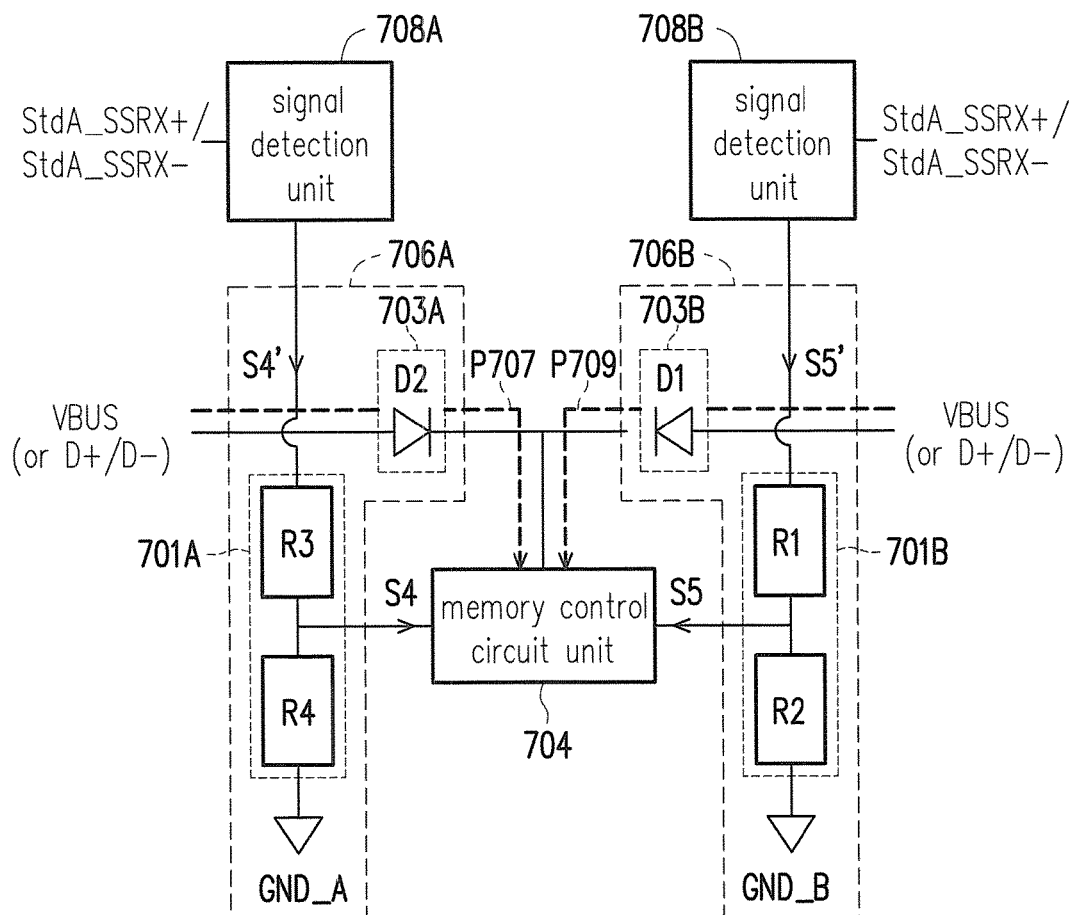
FIG. 7 is a schematic diagram illustrating a memory storage device according to another exemplary embodiment of the invention.

FIG. 7 is a schematic diagram illustrating a memory storage device according to another exemplary embodiment of the invention. Referring to FIG. 7, in order to clearly explain the present exemplary embodiment, FIG. 7 only illustrates a memory control circuit unit 704, interfacing circuits 706A and 706B and signal detection units 708A and 708B in a memory storage device 700. It should be noted that, in the present exemplary embodiment, the memory storage device 700 further includes the signal detection units 708A and 708B. The signal detection units 708A and 708B are configured to detect a plurality of analog signals provided by the connection interface units (not illustrated).

In the present exemplary embodiment, the analog signal includes (but not limited to) the high-speed transfer signal StdA_SSRX+/StdA_SSRX− in USB 3.0. The signal detection units 708A and 708B are electrically connected to voltage division circuits 701A and 701B of the interfacing circuits 706A and 706B respectively. The signal detection units 708A and 708B convert the detected analog signals into determination signals S4' and S5' suitable for the memory control circuit unit 704. Accordingly, the determination signals S4' and S5' herein include determination information of an electrically connecting configuration between at least one host system and at least one of a first connection interface unit 702A and a second connection interface unit 702B. In an exemplary embodiment where the analog signal is the high-speed transfer signal StdA_SSRX+/StdA_SSRX−, a frequency of the high-speed transfer signal StdA_SSRX+/StdA_SSRX− is higher than a frequency of the power signal VBUS or the data signal D+/D−. Therefore, a method of converting signal by the signal detection units 708A and 708B at least includes technical means of performing a down-conversion on the high-speed transfer signal StdA_SSRX+/StdA_SSRX−. Subsequently, the voltage division circuits 701A and 701B adjust the high-speed transfer signal processed by the down-conversion into determination signals S4 and S5 which fall within a voltage input range suitable for the memory control circuit unit 704. Thereafter, if the connection interface units of the memory storage device 700 are connected to the corresponding host system, according to differences between the connection interface units, the memory control circuit unit 704 provides different operation functions to the host system(s) connected by the connection interface units. Therefore, the signal detection units 708A and 708B are capable of detecting which one of the connection interface units of the memory storage device 700 is the high-speed transfer signal StdA_SSRX+/StdA_SSRX− from, so as to obtain the information regarding whether the connection interface units are connected to the host system.

In the present exemplary embodiment, the interfacing circuits 706A and 706B are disposed on first type signal transfer paths P707 and P709 respectively. In the present exemplary embodiment, the first type signal transfer path is, for example, an electrical transfer path suitable for transferring the power signal VBUS in USB 2.0 or USB 3.0. However, the invention is not limited thereto. In other exemplary embodiments, the first type signal transfer path may also be, for example, an electrical transfer path suitable for transferring the data signal D+/D− in USB 2.0 or USB 3.0.

In the present exemplary embodiment, each of the signal detection units 708A and 708B includes, for example, a potential detection circuit. The potential detection circuit is configured to compare a potential of the analog signal with a potential of a reference voltage, and convert the detected analog signal into the determination signals S4' and S5' suitable for the memory control circuit unit 704 according to a comparison result thereof.

Figure 8:
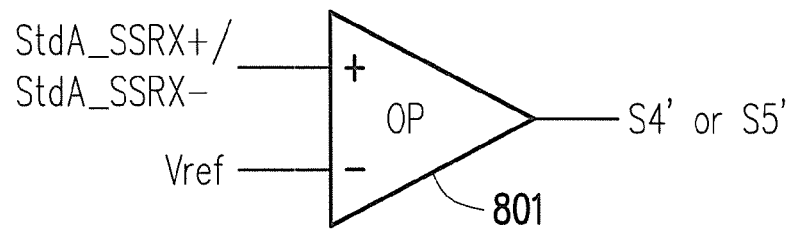
FIG. 8 is a schematic diagram illustrating a potential detection circuit according to an exemplary embodiment of the invention.

FIG. 8 is a schematic diagram illustrating a potential detection circuit according to an exemplary embodiment of the invention. Referring to FIG. 8, in the present exemplary embodiment, a potential detection circuit 800 includes an amplifier 801 which has a non-reversed terminal for receiving the analog signal, such as the high-speed transfer signal StdA_SSRX+/StdA_SSRX−. A reversed terminal of the amplifier 801 receives a reference voltage Vref. The amplifier 801 is used as a comparison circuit, wherein when a potential of the analog signal is higher than a potential of the reference voltage Vref, the amplifier 801 outputs the determination signals S4' or S5' with high potential at an output terminal thereof.

Figure 9:
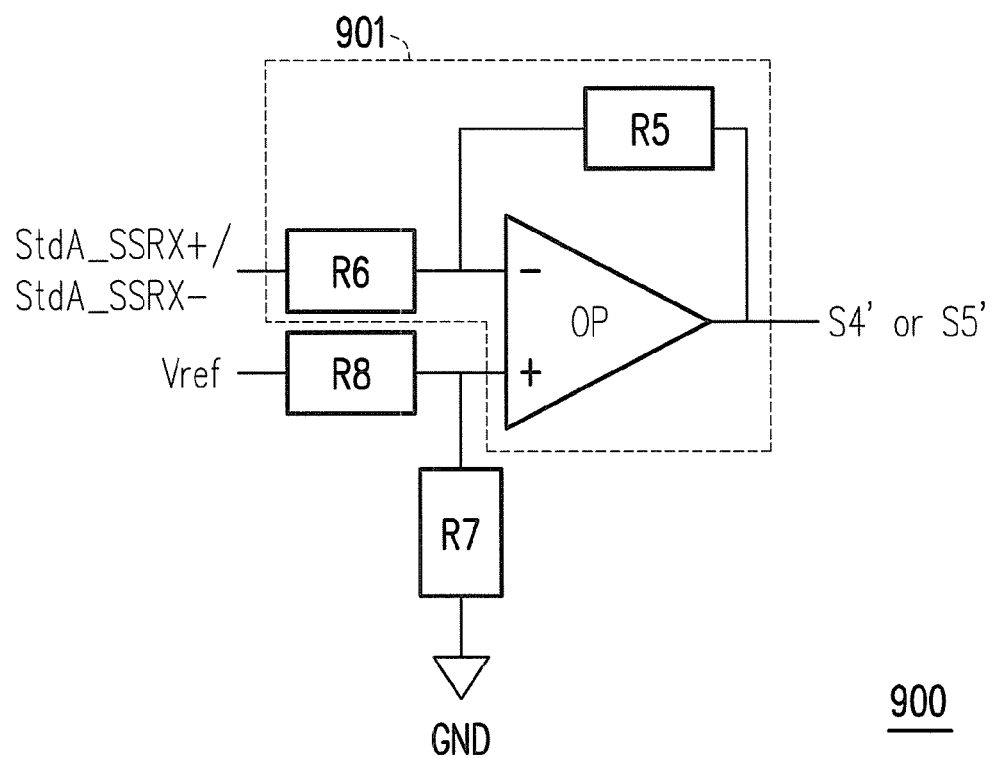
FIG. 9 is a schematic diagram illustrating a potential detection circuit according to another exemplary embodiment of the invention.

FIG. 9 is a schematic diagram illustrating a potential detection circuit according to another exemplary embodiment of the invention. Referring to FIG. 9, in the present exemplary embodiment, a potential detection circuit 900 includes a reversing amplifier 901, and voltage division circuits R7 and R8. The voltage division circuits R7 and R8 are coupled to the reversing amplifier 901, and configured to receive the reference voltage Vref, and perform a voltage division on the reference voltage Vref, so as to establish a base voltage which is lower than the analog signal at a non-reversed terminal of an amplifier OP. The non-reversed terminal of the amplifier OP receives the base voltage. A reversed terminal of the amplifier OP receives the analog signal (e.g., the high-speed transfer signal StdA_SSRX+/StdA_SSRX−) through a resistor R6. When a potential of the analog signal is higher than a potential of the base voltage, the reversing amplifier 901 outputs the determination signals S4' or S5' with low potential at an output terminal thereof.

It should be noted that, the circuit structures of the potential detection circuits depicted in FIG. 8 and FIG. 9 are merely served to describe at least one exemplary embodiment of the signal detection units 708A and 708B instead of limiting the invention.

Figure 10:
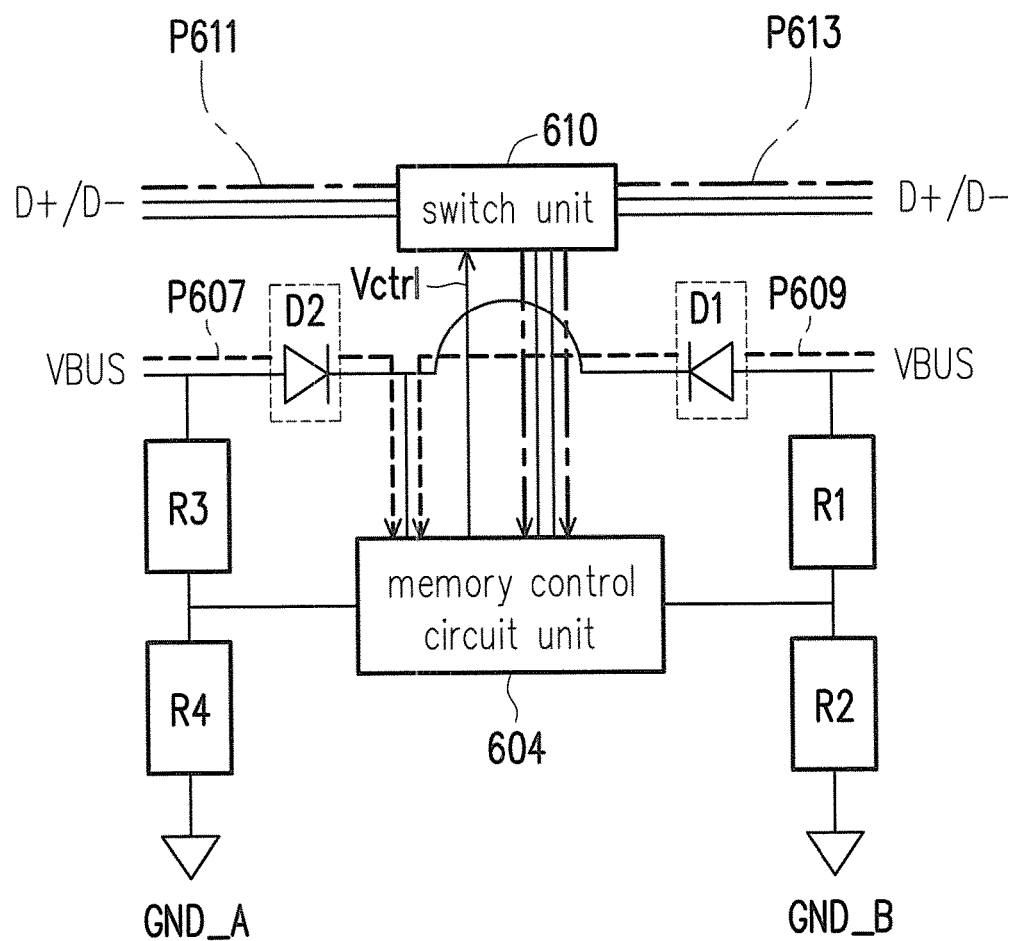
FIG. 10 is a schematic diagram illustrating a memory storage device according to another exemplary embodiment of the invention.

FIG. 10 is a schematic diagram illustrating a memory storage device according to another exemplary embodiment of the invention. Referring to FIG. 6A, FIG. 6B and FIG. 10, a memory storage device 1000 of the present exemplary embodiment is similar to the memory storage device 600 of FIG. 6A and FIG. 6B, and a major difference between the two is that the memory storage device 1000 further includes a switch unit 610. In the present exemplary embodiment, the switch unit 610 is electrically connected to the corresponding connection interface unit (not illustrated) and the memory control circuit unit 604 respectively by using a plurality of second type signal transfer paths P611 and P613.

In the present exemplary embodiment, the memory control circuit unit 604 uses at least one control signal Vctrl to control an on/off state of the switch unit 610, such that the corresponding connection interface unit is capable of transferring a signal to the memory control circuit unit 604 by using the second type signal transfer paths P611 and P613. In the present exemplary embodiment, the signal transferred by the connection interface unit is, for example, the data signal D+/D− in USB 2.0 or USB 3.0. However, the invention is not limited thereto. In another embodiment, the signal transferred by the connection interface unit is, for example, the high-speed transfer signal StdA_SSRX+/StdA_SSRX− in USB 3.0.

In the present exemplary embodiment, the first type signal transfer paths P607 and P609 are, for example, an electrical transfer path suitable for transferring the power signal VBUS in USB 2.0 or USB 3.0. However, the invention is not limited thereto. In other exemplary embodiments, the first type signal transfer path may also be, for example, an electrical transfer path suitable for transferring the data signal D+/D− in USB 2.0 or USB 3.0.

In the present exemplary embodiment, when one of the connection interface units of the memory storage device 1000 is electrically connected to the host system, it indicates that, for example, the first type signal transfer paths P607 and P611 receive the power signal VBUS and the data signal D+/D− respectively. In this case, the memory control circuit unit 604 uses the control signal Vctrl to control the switch unit 610 in order to cut off the second type signal transfer path P613 between another one of the connection interface units and the memory control circuit unit 604. In this example, the host system connected to the another one of the connection interface units is prohibited to access the data stored in the memory storage device 1000.

On the other hand, in the present exemplary embodiment, when the another one of the connection interface units of the memory storage device 1000 is electrically connected to the host system, it indicates that, for example, the first type signal transfer path P609 and the second type signal transfer path P613 receive the power signal VBUS and the data signal D+/D− respectively. In this case, the memory control circuit unit 604 uses the control signal Vctrl to control the switch unit 610 in order to cut off the second type signal transfer path P611 between the one of the connection interface units and the memory control circuit unit 604 in the memory storage device 1000. In this example, the host system connected to the one of the connection interface units of the memory storage device 1000 is prohibited to access the data stored in the memory storage device 1000. Therefore, in the present exemplary embodiment, when signals are inputted to all of the connection interface units, the memory storage device 1000 is capable of using the switch unit 610 to cut off the signal transfer paths between one of the connection interface units and the memory control circuit unit 604.

In addition, enough teaching, suggestion, and implementation illustration for disposing configurations, operation methods and effects of other circuitry blocks and elements for the memory storage device 1000 in the embodiment of FIG. 10 can be obtained from the above embodiments in FIG. 6A and FIG. 6B, thus related descriptions thereof are not repeated hereinafter.

Figure 11:
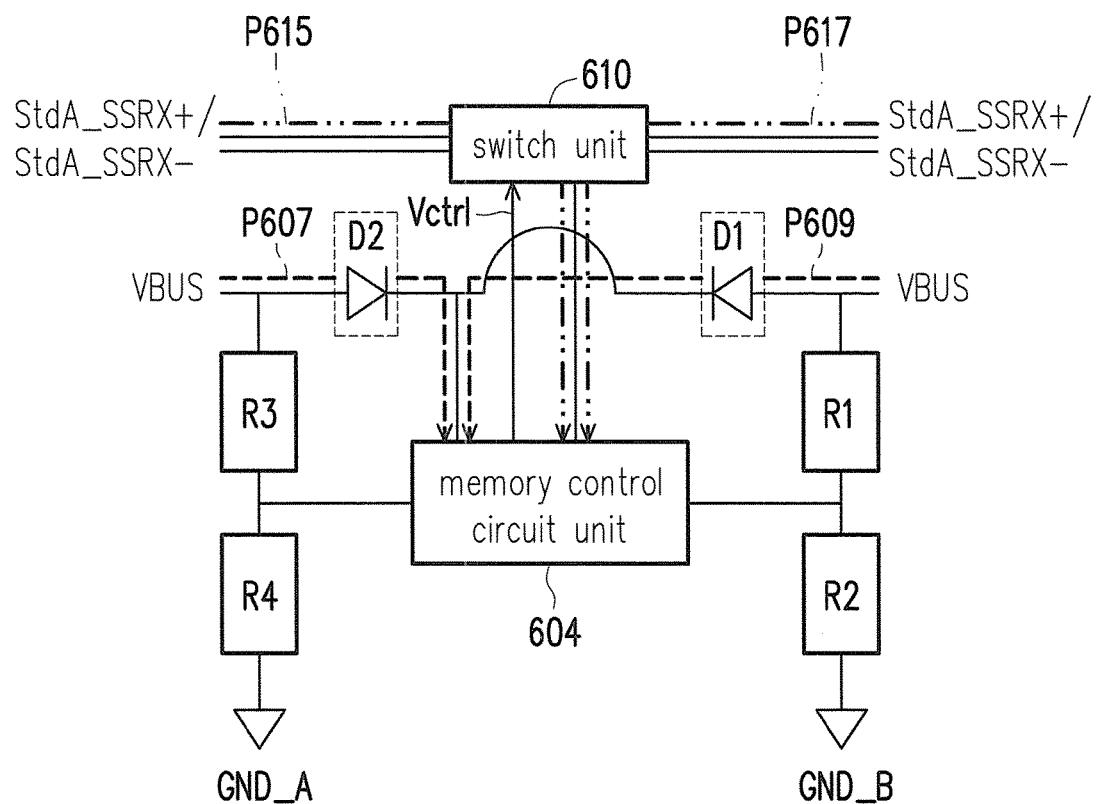
FIG. 11 is a schematic diagram illustrating a memory storage device according to another exemplary embodiment of the invention.

FIG. 11 is a schematic diagram illustrating a memory storage device according to another exemplary embodiment of the invention. Referring to FIG. 10 and FIG. 11, a memory storage device 1100 of the present exemplary embodiment is similar to the memory storage device 1000 of FIG. 10, and a major difference between the two is that a signal transferred by connection interface units (not illustrated) of the memory storage device 1100 by using second type signal transfer paths P615 and P617 is, for example, the high-speed transfer signal StdA_SSRX+/StdA_SSRX− in USB 3.0. Accordingly, the memory control circuit unit 604 may obtain information regarding whether the connection interface units are connected to the host system, and then use the control signal Vctrl to control the on/off state of the switch unit 610.

In addition, enough teaching, suggestion, and implementation illustration for disposing configurations, operation methods and effects of other circuitry blocks and elements for the memory storage device 1100 in the embodiment of FIG. 11 can be obtained from the above embodiments in FIG. 6B, FIG. 6B and FIG. 10, thus related descriptions thereof are not repeated hereinafter.

In the foregoing exemplary embodiment, the memory storage device includes one memory control circuit unit for example. In other exemplary embodiments, the memory storage device may also include a memory control circuit module, and this memory control circuit module includes one or more memory control circuit units. In this kind of memory storage device, two connection interface units are electrically connected to different input/output channels in one memory control circuit module. The memory control circuit module is capable of making different declarations to the host system electrically connected to different connection interface units. The memory control circuit module may include two memory control circuit units or one single memory control circuit unit.

Figure 12:
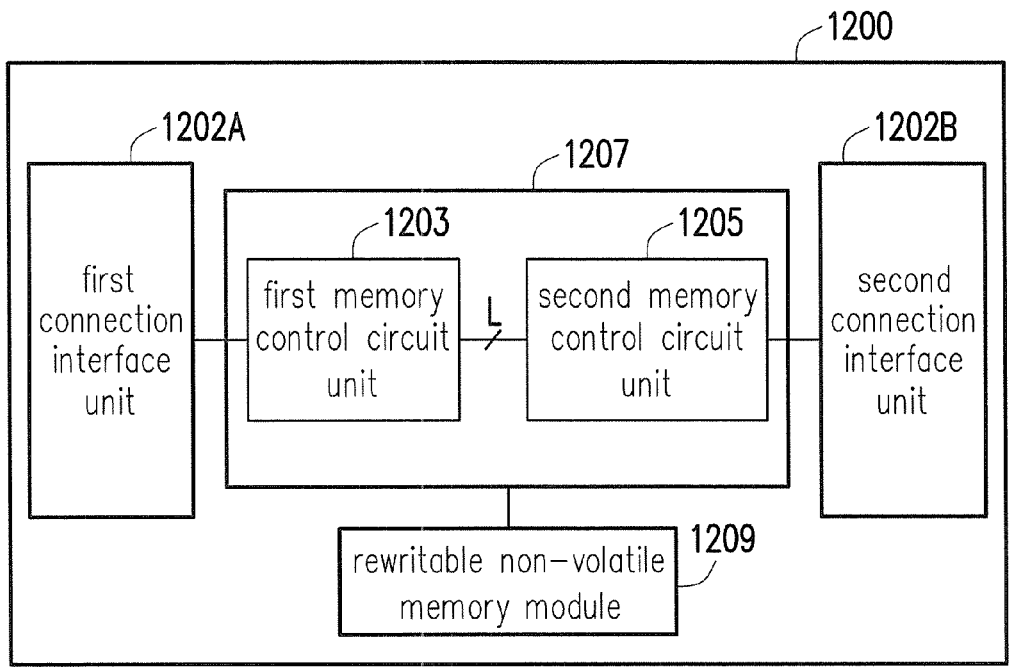
FIG. 12 is a schematic diagram illustrating a memory storage device according to another exemplary embodiment of the invention.

FIG. 12 is a schematic diagram illustrating a memory storage device according to another exemplary embodiment of the invention. Referring to FIG. 2 and FIG. 12, a memory storage device 1200 of the present exemplary embodiment is similar to the memory storage device 100 of FIG. 2, and a major difference between the two is that a memory control circuit module 1207 includes a first memory control circuit unit 1203 and a second memory control circuit unit 1205. The memory control circuit module 1207 includes a plurality of input/output channels. A first connection interface unit 1202A and a second connection interface unit 1202B are electrically connected to different input/output channels of the memory control circuit module 1207 respectively. In the present exemplary embodiment, the first memory control circuit unit 1203 and the second memory control circuit unit 1205 determine whether the first connection interface unit 1202A and the second connection interface unit 1202B are electrically connected to the corresponding host systems respectively by using one of the power signal VBUS, the data signal D+/D− and the high-speed transfer signal StdA_SSRX+/StdA_SSRX− transferred by the first connection interface unit 1202A and the second connection interface unit 1202B. The memory control circuit units 1203 and 1205 of the memory control circuit module 1207 are communicated through a coordination signal L, so as to access data stored in a rewritable non-volatile memory module 1209 in way of time division.

In the present exemplary embodiment, the memory control circuit module 1207 declares the memory storage device 1200 as different electronic devices to the connected host system, and provides the different operation functions to the connected host system according to an electrically connecting configuration between the at least one host system and the first connection interface unit 1202A and the second connection interface unit 1202B.

Specifically, in the present exemplary embodiment, the first memory control circuit unit 1203 is configured to be electrically connected to the first connection interface unit 1202A. The first memory control circuit unit 1203 determines an electrically connecting configuration between at least one host system and at least one of the first connection interface unit 1202A and the second connection interface unit 1202B by using one of the power signal VBUS, the data signal D+/D− and the high-speed transfer signal StdA_SRX+/StdA_SSRX− transferred by the first connection interface unit 1202A. That is, whether the first connection interface unit 1202A is electrically connected to one corresponding host system is determined. The second memory control circuit unit 1205 is configured to be electrically connected to the second connection interface unit 1202B. The second memory control circuit unit 1205 determines an electrically connecting configuration between at least one host system and at least one of the first connection interface unit 1202B and the second connection interface unit 1202B by using one of the power signal VBUS, the data signal D+/D− and the high-speed transfer signal StdA_SSRX+/StdA_SSRX− transferred by the second connection interface unit 1202B. That is, whether the second connection interface unit 1202B is electrically connected to another one corresponding host system is determined. When one of the first memory control circuit unit 1203 and the second memory control circuit unit 1205 accesses data stored in the rewritable non-volatile memory module, another one of the first memory control circuit unit 1203 and the second memory control circuit unit 1205 does not access the data stored in the rewritable non-volatile memory module. In other words, the first memory control circuit unit 1203 and the second memory control circuit unit 1205 are communicated through a coordination signal L, so as to access data stored in a rewritable non-volatile memory module 1209 in way of time division or in different times. Therefore, in the present exemplary embodiment, the memory storage device 1200 is capable of accessing different interface transfer signals by using different memory control circuit units.

In the present exemplary embodiment, if the first connection interface unit 1202A or the second connection interface unit 1202B are compatible with the transmission interface standard of USB 2.0, electrical signals transferred by the first connection interface unit 1202A or the second connection interface unit 1202B include one of the power signal VBUS and the data signal D+/D−. In the present exemplary embodiment, if the first connection interface unit 1202A or the second connection interface unit 1202B are compatible with the transmission interface standard of USB 3.0, electrical signals transferred by the first connection interface unit 1202A or the second connection interface unit 1202B include one of the power signal VBUS, the data signal D+/D− and the high-speed transfer signal StdA_SSRX+/StdA_SSRX−.

In the present exemplary embodiment, the first connection interface unit 1202A and the second connection interface unit 1202B may all be compatible with the same transmission interface stand, or include one compatible with a first transmission interface standard while the other one compatible with a second transmission interface standard. For instance, the first connection interface unit 1202A and the second connection interface unit 1202B are, for example, both compatible with the transmission interface standard of USB 2.0 or both compatible with the transmission interface standard of USB 3.0. Alternatively, the first connection interface unit 1202A may be, for example, compatible with the transmission interface standard of USB 1.1, and the second connection interface unit 1202B may be, for example, compatible with the transmission interface standard of the SATA standard. Alternatively, the first connection interface unit 1202A may be, for example, compatible with the transmission interface standard of USB 3.0, and the second connection interface unit 1202B may be, for example, compatible with the transmission interface standard of the eMMC standard. In other words, the transmission interface standards to which the first connection interface unit 1202A and the second connection interface unit 1202B are compatible with are not particularly limited in the invention.

In the present exemplary embodiment, although it is illustrated by using the memory control circuit module including two memory control circuit units for example, the invention is not limited thereto. In other embodiments, the memory control circuit module may also include only one single memory control circuit unit. Enough teaching, suggestion, and implementation illustration for disposing configurations, operation methods and effects of other circuitry blocks and elements for the one single memory control circuit unit can be obtained from the above embodiments in FIG. 12, thus related descriptions thereof are not repeated hereinafter.

Figure 13:
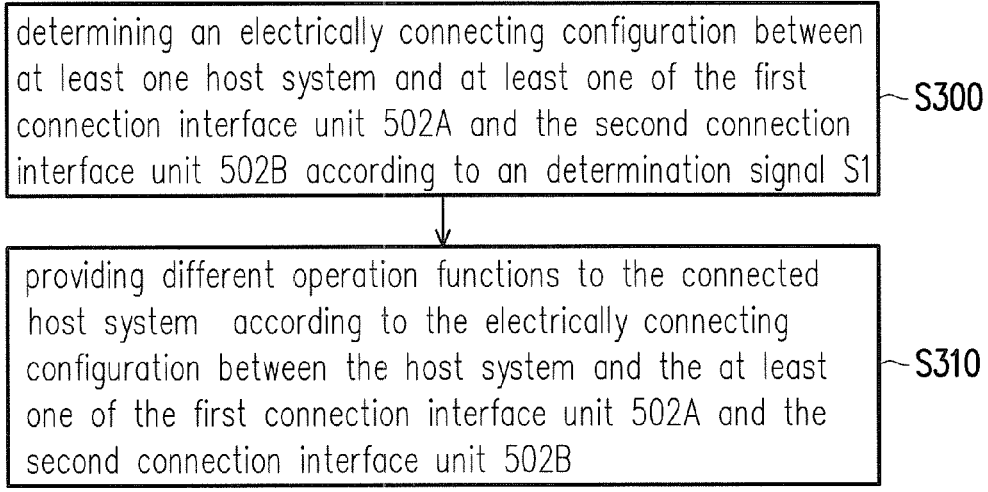
FIG. 13 is a flowchart illustrating steps of a control method of memory storage device according to an exemplary embodiment of the invention.

FIG. 13 is a flowchart illustrating steps of a control method of memory storage device according to an exemplary embodiment of the invention. Referring to FIG. 4, FIG. 5 and FIG. 13, a control method of memory storage device according to the present exemplary embodiment is, for example, at least suitable for the memory storage device 100 of FIG. 5. The control method of memory storage device according to the present exemplary embodiment includes the following steps. In step S300, the memory control circuit unit 504 determines an electrically connecting configuration between at least one host system and at least one of the first connection interface unit 502A and the second connection interface unit 502B according to a determination signal S1. Herein, the host system electrically connected to the at least one of the first connection interface unit 502A and the second connection interface unit 502B may be one or more identical or different host systems. In the present exemplary embodiment, the interfacing circuit 506 is configured to output the determination signal S1. Subsequently, in step S310, the memory control circuit unit 504 provides different operation functions to the connected host system according to the electrically connecting configuration between the host system and the at least one of the first connection interface unit 502A and the second connection interface unit 502B.

Figure 14:
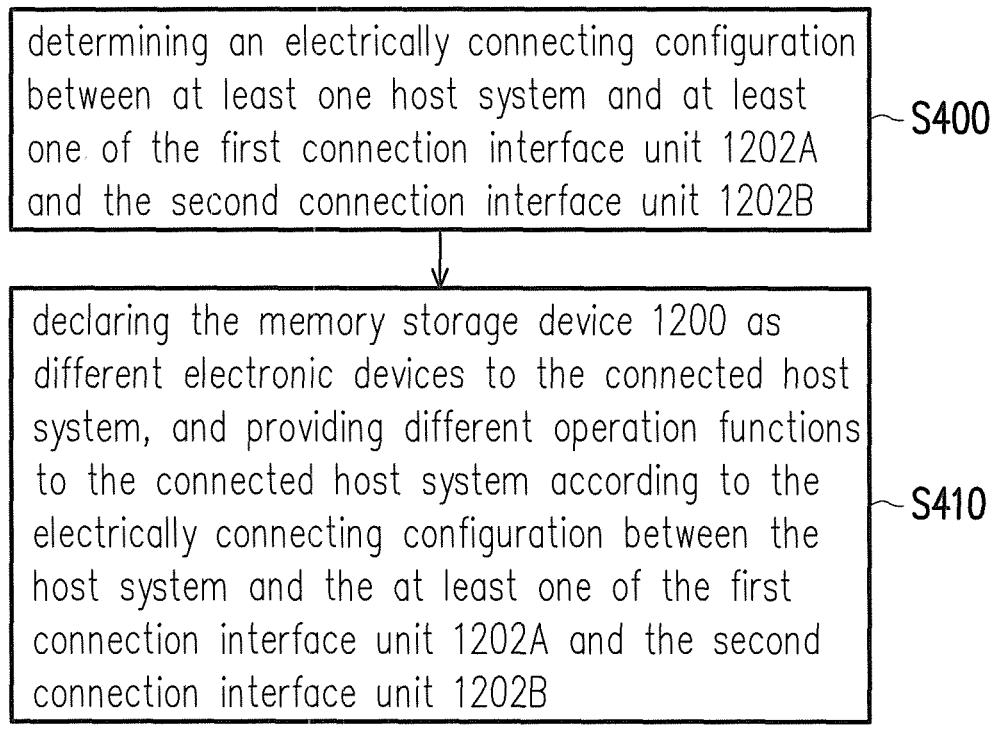
FIG. 14 is a flowchart illustrating steps of a control method of memory storage device according to another exemplary embodiment of the invention.

FIG. 14 is a flowchart illustrating steps of a control method of memory storage device according to an exemplary embodiment of the invention. Referring to FIG. 12 and FIG. 14, a control method of memory storage device according to the present exemplary embodiment is, for example, suitable for the memory storage device 1200 of FIG. 12. The control method of memory storage device according to the present exemplary embodiment includes the following steps. In step S400, the memory control circuit module 1207 determines an electrically connecting configuration between at least one host system and at least one of the first connection interface unit 1202A and the second connection interface unit 1202B. Herein, the host system electrically connected to the at least one of the first connection interface unit 1202A and the second connection interface unit 1202B may be one or more identical or different host systems. Subsequently, in step S410, the memory control circuit module 1207 declares the memory storage device 1200 as different electronic devices to the connected host system, and provides different operation functions to the connected host system according to the electrically connecting configuration between the host system and the at least one of the first connection interface unit 1202A and the second connection interface unit 1202B.

In addition, enough teaching, suggestion, and implementation illustration of the control method of memory storage device according to exemplary embodiments of the invention may be obtained from the above embodiments depicted in FIG. 1 to FIG. 12, which are not repeated hereinafter.

In summary, in the exemplary embodiments of the invention, according to the electrically connecting configuration between the connection interface units and the host system, the memory control circuit unit is capable of providing different operation functions to the host system connected by the connection interface units in correspondence to the different connection interface units. The different operation functions include making the same or different declarations to the connected host system. In addition, in an exemplary embodiment, when signals are inputted to all of the connection interface units, the memory storage device is capable of using the switch unit to cut off the signal transfer paths between one of the connection interface units and the memory control circuit unit. In an exemplary embodiment, the memory storage device is capable of accessing different interface transfer signals by using different memory control circuit units.

The previously described exemplary embodiments of the present invention have many advantages, including providing different operation functions to a host system connected by connection interface units, wherein the advantages aforementioned not required in all versions of the invention.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A memory storage device, comprising:
   a first connection interface unit and a second connection interface unit;
   a memory control circuit unit, comprising an input/output channel, wherein the first connection interface unit and the second connection interface unit are electrically connected to the input/output channel of the memory control circuit unit;
   a rewritable non-volatile memory module, electrically connected to the memory control circuit unit and configured to store data written by the at least one host system; and
   at least one interfacing circuit, disposed between the memory control circuit unit and at least one of the first connection interface unit and the second connection interface unit, wherein the at least one interfacing circuit provides a determination information by determining whether the first connection interface unit is electrically connected between at least one host system and the memory control circuit unit, and determining whether the second connection interface unit is electrically connected between at least one host system and the memory control circuit unit,
   wherein the at least one interfacing circuit is configured to provide the determination information to the memory control circuit unit wherein the determination information indicates which one or both of the first connection interface unit and the second connection interface unit connected between at least one host system and the memory control circuit unit,
   wherein the memory control circuit unit is configured to provide different operation functions to the at least one host system based on the determination information.

2. The memory storage device of claim 1, wherein the memory control circuit unit is configured to determine whether the at least one host system is electrically connected to the first connection interface unit or the second connection interface unit based on the determination information, and the memory control circuit unit declares the memory storage device as different electronic devices to the at least one host system and provides the different operation functions to the at least one host system according to the at least one host system being electrically connected to the first connection interface unit or the second connection interface unit.

3. The memory storage device of claim 1, wherein the memory control circuit unit is configured to determine a electrically connecting configuration among the at least one host system, the first connection interface unit and the second connection interface unit based on the determination information, and the memory control circuit unit declares the memory storage device as different electronic devices to the at least one host system and provides the different operation functions to the at least one host system according to differences in the electrically connecting configuration.

4. The memory storage device of claim 1, wherein the different operation functions provided by the memory control circuit unit comprise at least one of a multimedia access function, a data input/output interface function and an information security certification function.

5. The memory storage device of claim 1, wherein the memory control circuit unit is configured to declare the memory storage device as an identical electronic device to the at least one host system and provide the different operation functions to the at least one host system when the at least one host system is electrically connected to the first connection interface unit and the second connection interface unit, wherein the different operation functions provided by the memory control circuit unit comprise different operation authorities for the memory storage device.

6. The memory storage device of claim 1, wherein each of the first connection interface unit and the second connection interface unit is electrically connected to the input/output channel of the memory control circuit unit through a first type signal transfer path, wherein the at least one interfacing circuit is disposed on at least one of the first type signal transfer paths, and the at least one interfacing circuit outputs at least one determination signal to the memory control circuit unit, such that the memory control circuit unit is capable of determining whether the first connection interface unit and the second connection interface unit are electrically connected to the at least one host system accordingly, wherein the at least one determination signal comprises the determination information.

7. The memory storage device of claim 6, wherein the first type signal transfer paths are suitable for transferring at least one of a power signal and a data signal of the first connection interface unit and the second connection interface unit.

8. The memory storage device of claim 1, wherein the at least one interfacing circuit comprises:
   a current limit circuit, electrically connected between the memory control circuit unit and the first connection interface unit or the second connection interface unit, wherein the current limit circuit is configured to limit a transfer direction of a signal provided by the electrically connected first connection interface unit or the electrically connected second connection interface unit to be transferred from the first connection interface unit or the second connection interface unit to the memory control circuit unit; and
   a voltage division circuit, electrically connected between the memory control circuit unit and the first connection interface unit or the second connection interface unit, wherein the voltage division circuit is configured to perform a voltage division on the signal provided by the first connection interface unit or the second connection interface unit, so as to output a determination signal comprising the determination information to the memory control circuit unit.

9. The memory storage device of claim 1, further comprising:
   at least one signal detection unit, electrically connected to the at least one of the first connection interface unit and the second connection interface unit and the at least one interfacing circuit, wherein the at least one signal detection unit is configured to detect at least one analog signal provided by the at least one of the first connection interface unit and the second connection interface unit and convert the at least one analog signal into at least one determination signal suitable for the memory control circuit unit, wherein the at least one determination signal comprises the determination information.

10. The memory storage device of claim 9, wherein the at least one signal detection unit comprises:
    a potential detection circuit, configured to compare a potential of the at least one analog signal with a potential of a reference voltage and convert the detected at least one analog signal into the at least one determination signal suitable for the memory control circuit unit according to a comparison result thereof.

11. The memory storage device of claim 1, further comprising:
at least one switch unit, configured to be electrically connected to the first connection interface unit, the second connection interface unit and the memory control circuit unit respectively by using a plurality of second type signal transfer paths,
wherein the memory control circuit unit uses at least one control signal to control an on/off state of the at least one switch unit, such that one of the first connection interface unit and the second connection interface unit is capable of transferring signals to the memory control circuit unit by using the second type signal transfer paths.

12. The memory storage device of claim 11, wherein the second type signal transfer paths are suitable for transferring at least one of a high-speed transfer signal and a data signal of the connection interface units.

13. A memory control circuit unit, configured to control a rewritable non-volatile memory module, and the memory control circuit unit comprising:
a host interface, comprising an input/output channel, wherein a first connection interface unit and a second connection interface unit are electrically connected to the Input/output channel of the host interface;
a memory interface, configured to be electrically connected to the rewritable non-volatile memory module; and
a memory management circuit, electrically connected to the host interface and the memory interface,
wherein at least one interfacing circuit is disposed between the memory control circuit unit and at least one of the first connection interface unit and the second connection interface unit and configured to provide determination information by determining whether the first connection interface unit is electrically connected between at least one host system and the memory control circuit unit, and determining whether the second connection interface unit is electrically connected between at least one host system and the memory control circuit unit,
wherein the at least one interfacing circuit is configured to provide the determination information to the memory management circuit, and the memory management circuit is configured to provide different operation functions to the at least one host system based on the determination information, wherein the determination information indicates which one or both of the first connection interface unit and the second connection interface unit connected between at least one host system and the memory control circuit unit.

14. A control method of memory storage device, for controlling a memory storage device, wherein the memory storage device comprises a memory control circuit unit, a first connection interface unit, a second connection interface unit and a rewritable non-volatile memory module, and the control method of memory storage device comprises:
determining an electrically connecting configuration according to at least one determination signal, wherein the memory storage device further comprises at least one interfacing circuit, and the at least one interfacing circuit is disposed between the memory control circuit unit and the at least one of the first connection interface unit and the second connection interface unit and configured to output the at least one determination signal by determining whether the first connection interface unit is electrically connected between at least one host system and the memory control circuit unit, and determining whether the second connection interface unit is electrically connected between at least one host system and the memory control circuit unit,
wherein the electrically connecting configuration indicates which one or both of the first connection interface unit and the second connection interface unit connected between at least one host system and the memory control circuit unit; and
providing different operation functions to the at least one host system according to the electrically connecting configuration.

15. The control method of memory storage device of claim 14, wherein the step of providing the different operation functions to the at least one host system comprises declaring the memory storage device as different electronic devices to the at least one host system, and providing the different operation functions to the at least one host system according to the at least one host system being electrically connected to the first connection interface unit or the second connection interface unit.

16. The control method of memory storage device of claim 14, wherein the step of providing the different operation functions to the at least one host system comprises declaring the memory storage device as different electronic devices to the at least one host system, and providing the different operation functions to the at least one host system according to differences in the electrically connecting configuration among the at least one host system, the first connection interface unit and the second connection interface unit.

17. The control method of memory storage device of claim 14, wherein the different operation functions provided comprise at least one of a multimedia access function, a data input/output interface function and an information security certification function.

18. The control method of memory storage device of claim 14, wherein when the at least one host system is electrically connected to the first connection interface unit and the second connection interface unit, the step of providing the different operation functions to the at least one host system comprises declaring the memory storage device as an identical electronic device to the at least one host system, and providing the different operation functions to the at least one host system, wherein the different operation functions provided by the memory control circuit unit comprise different operation authorities for the memory storage device.

19. The control method of memory storage device of claim 14, wherein the first connection interface unit and the second connection interface unit are configured to output a power signal, a data signal and a high-speed transfer signal, and the step of determining the electrically connecting configuration between the at least one host system and the at least one of the first connection interface unit and the second connection interface unit comprises determining whether the connection interface units are electrically connected to the at least one host system according to one of the power signal, the data signal and the high-speed transfer signal.

20. A memory storage device, comprising:
a first connection interface unit and a second connection interface unit;
a memory control circuit module, comprising a plurality of input/output channels, wherein the first connection interface unit and the second connection interface unit are electrically connected to the different input/output channels of the memory control circuit module; and a rewritable non-volatile memory module, electrically connected to the memory control circuit module, wherein the rewritable non-volatile memory module is configured to store data written by the at least one host system, wherein the memory control circuit module declares the memory storage device as different electronic devices to the at least one host system and provides different operation functions to the at least one host system according to an electrically connecting configuration, wherein the electrically connecting configuration indicates which one or both of the first connection interface unit and the second connection interface unit connected between at least one host system and the memory control circuit module.

21. The memory storage device of claim 20, wherein the memory control circuit module is configured to determine the electrically connecting configuration by determining whether the first connection interface unit is electrically connected between at least one host system and the memory control circuit module, and determining whether the second connection interface unit is electrically connected between at least one host system and the memory control circuit module, and the memory control circuit module declares the memory storage device as different electronic devices to the at least one host system and provides the different operation functions to the at least one host system according to differences in the electrically connecting configuration.

22. The memory storage device of claim 20, wherein the different operation functions provided by the memory control circuit module comprise at least one of a multimedia access function, a data input/output interface function and an information security certification function.

23. The memory storage device of claim 20, wherein the memory control circuit module comprises:

at least one memory control circuit unit, electrically connected to the first connection interface unit and the second connection interface unit, wherein the at least one memory control circuit unit is configured to determine the electrically connecting configuration between the at least one host system and the at least one of the first connection interface unit and the second connection interface unit by using one of a power signal, a data signal and a high-speed transfer signal transferred by the first connection interface unit and the second connection interface unit.

24. The memory storage device of claim 20, wherein the memory control circuit module comprises:

a first memory control circuit unit, electrically connected to the first connection interface unit, wherein the first memory control circuit unit is configured to determine whether the first connection interface unit is electrically connected to the at least one host system by using one of the power signal, the data signal and the high-speed transfer signal transferred by the first connection interface unit; and a second memory control circuit unit, electrically connected to the second connection interface unit, wherein the second memory control circuit unit is configured to determine whether the second connection interface unit is electrically connected to the at least one host system by using one of the power signal, the data signal and the high-speed transfer signal transferred by the second connection interface unit.

25. The memory storage device of claim 24, wherein the first memory control circuit unit and the second memory control circuit unit are communicated through a coordination signal, wherein when one of the first memory control circuit unit and the second memory control circuit unit accesses data stored in the rewritable non-volatile memory module, another one of the first memory control circuit unit and the second memory control circuit unit does not access the data stored in the rewritable non-volatile memory module.

26. A memory control circuit module, disposed in a memory storage device, and the memory control circuit module comprising:

at least one memory control circuit unit, comprising a plurality of input/output channels, wherein a first connection interface unit and a second connection interface unit are electrically connected to different input/output channels in the at least one memory control circuit unit, wherein the at least one memory control circuit unit is configured to determine an electrically connecting configuration by determining whether the first connection interface unit is electrically connected between at least one host system and the at least one memory control circuit unit, and determining whether the second connection interface unit is electrically connected between at least one host system and the at least one memory control circuit unit, and the at least one memory control circuit unit declares the memory storage device as different electronic devices to the at least one host system and provides different operation functions to the at least one host system according to the electrically connecting configuration, wherein the electrically connecting configuration indicates which one or both of the first connection interface unit and the second connection interface unit connected between at least one host system and the at least one memory control circuit unit.

27. A control method of memory storage device, for controlling a memory storage device, wherein the memory storage device comprises a memory control circuit unit, a first connection interface unit, a second connection interface unit and a rewritable non-volatile memory module, and the control method of memory storage device comprises:

determining an electrically connecting configuration by determining whether the first connection interface unit is electrically connected between at least one host system and the memory control circuit unit, and determining whether the second connection interface unit is electrically connected between at least one host system and the memory control circuit unit, wherein the electrically connecting configuration indicates which one or both of the first connection interface unit and the second connection interface unit connected between at least one host system and the memory control circuit unit; and declaring the memory storage device as different electronic devices to the at least one host system, and providing different operation functions to the at least one host system according to the electrically connecting configuration.

28. The control method of memory storage device of claim 27, wherein the step of providing the different operation functions to the at least one host system comprises declaring the memory storage device as different electronic devices to the at least one host system, and providing the different operation functions to the at least one host system according to the electrically connecting configuration among the at least one host system, the first connection interface unit and the second connection interface unit.

29. The control method of memory storage device of claim 28, wherein the different operation functions provided comprise at least one of a multimedia access function, a data input/output interface function and an information security certification function.

30. The control method of memory storage device of claim 27, wherein the first connection interface unit and the second connection interface unit are configured to output a power signal, a data signal and a high-speed transfer signal, and the step of determining the electrically connecting configuration between the at least one host system and the at least one of the first connection interface unit and the second connection interface unit comprises determining the electrically connecting configuration among the at least one host system, the first connection interface unit and the second connection interface unit according to one of the power signal, the data signal and the high-speed transfer signal.

* * * * *